United States Patent
Wang et al.

(10) Patent No.: US 12,192,956 B2
(45) Date of Patent: Jan. 7, 2025

(54) DEVICE COOPERATION METHOD, APPARATUS, AND SYSTEM FOR JOINTLY COMPLETING AN EVENT WITH ANOTHER DEVICE

(71) Applicant: Huawei Technologies Co., Ltd., Shenzhen (CN)

(72) Inventors: Chenglu Wang, Shenzhen (CN); Dongliang Liu, Shenzhen (CN); Bowen Zheng, Nanjing (CN); Yilong Cao, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 430 days.

(21) Appl. No.: 17/599,406

(22) PCT Filed: Mar. 27, 2020

(86) PCT No.: PCT/CN2020/081542
§ 371 (c)(1),
(2) Date: Sep. 28, 2021

(87) PCT Pub. No.: WO2020/200061
PCT Pub. Date: Oct. 8, 2020

(65) Prior Publication Data
US 2022/0191822 A1    Jun. 16, 2022

(30) Foreign Application Priority Data
Mar. 29, 2019  (CN) .......................... 201910250833.6

(51) Int. Cl.
*H04W 68/00*    (2009.01)
*H04W 76/10*    (2018.01)

(52) U.S. Cl.
CPC ......... *H04W 68/005* (2013.01); *H04W 76/10* (2018.02)

(58) Field of Classification Search
CPC ........................... H04W 68/005; H04W 76/10
(Continued)

(56) References Cited

U.S. PATENT DOCUMENTS

| 2006/0164324 A1 | 7/2006 | Polivy et al. |
| 2007/0046562 A1 | 3/2007 | Polivy et al. |

(Continued)

FOREIGN PATENT DOCUMENTS

| CN | 1782997 A | 6/2006 |
| CN | 101447843 A | 6/2009 |

(Continued)

OTHER PUBLICATIONS

Yu Xingye, "Architecture of Information Equipment Resource Sharing Collaborative Service Standard," ZTE Technologies, Issue 4, total 7 pages (2006). with an English Abstract.

*Primary Examiner* — Mark G. Pannell
(74) *Attorney, Agent, or Firm* — Leydig, Voit & Mayer, Ltd.

(57) ABSTRACT

A system comprises a primary device, the primary device pre-establishes communication connections to a plurality of secondary devices. The method comprising: receiving, by the primary device, a to-be-processed event; recognizing, by the primary device, an event type and event information of the to-be-processed event; obtaining, by the primary device, device information of each of the plurality of secondary devices; obtaining, by the primary device, a device filtering condition corresponding to the event type; determining, by the primary device based on the device information of each of the plurality of secondary devices, a first secondary device that meets the device filtering condition; and sending, by the primary device, the event type and the event information to the first secondary device when the primary device (Continued)

determines that a data type of the event information is a data type supported by the first secondary device.

17 Claims, 17 Drawing Sheets

(58) Field of Classification Search
USPC .......................................................... 370/310
See application file for complete search history.

(56) References Cited

U.S. PATENT DOCUMENTS

| | | | |
|---|---|---|---|
| 2014/0196099 A1* | 7/2014 | Hybertson | H04N 21/4334 725/88 |
| 2014/0228063 A1* | 8/2014 | Harris | H04L 67/303 455/500 |
| 2014/0274185 A1* | 9/2014 | Luna | H04L 65/1086 455/517 |
| 2016/0019858 A1 | 1/2016 | Wang et al. | |
| 2017/0185375 A1 | 6/2017 | Martel et al. | |
| 2017/0346793 A1 | 11/2017 | Gould et al. | |
| 2018/0335903 A1* | 11/2018 | Coffman | G06F 3/04847 |
| 2019/0341048 A1* | 11/2019 | Cheng | H04L 12/4625 |

FOREIGN PATENT DOCUMENTS

| | | |
|---|---|---|
| CN | 102314502 A | 1/2012 |
| CN | 102938787 A | 2/2013 |
| CN | 104506991 A | 4/2015 |
| CN | 104715188 A | 6/2015 |
| CN | 104982022 A | 10/2015 |
| CN | 105095120 A | 11/2015 |
| CN | 105828275 A | 8/2016 |
| CN | 106034114 A | 10/2016 |
| CN | 106453568 A | 2/2017 |
| CN | 106550101 A | 3/2017 |
| CN | 106598204 A | 4/2017 |
| CN | 106843031 A | 6/2017 |
| CN | 106855823 A | 6/2017 |
| CN | 106886279 A | 6/2017 |
| CN | 107077661 A | 8/2017 |
| CN | 107454176 A | 12/2017 |
| CN | 107490975 A | 12/2017 |
| CN | 107896180 A | 4/2018 |
| CN | 108646997 A | 10/2018 |
| CN | 108769261 A | 11/2018 |
| CN | 109377987 A | 2/2019 |
| WO | 2018213401 A1 | 11/2018 |

* cited by examiner

DEVICE COOPERATION METHOD, APPARATUS, AND SYSTEM FOR JOINTLY COMPLETING AN EVENT WITH ANOTHER DEVICE

CROSS-REFERENCE TO RELATED APPLICATIONS

This application is a National Stage of International Patent Application No. PCT/CN2020/081542, filed on Mar. 27, 2020, which claims priority to Chinese Patent Application No. 201910250833.6, filed on Mar. 29, 2019. Both of the aforementioned applications are hereby incorporated by reference in their entireties.

TECHNICAL FIELD

Embodiments of this application relate to the field of communications technologies, and in particular, to a device cooperation method, an apparatus, and a system.

BACKGROUND

With development of technologies, increasingly more smart devices have been developed and produced, and become daily consumer goods of people. For example, smart devices such as smartphones, tablet computers, smart televisions, smart speakers, and smart bands are widely used by people.

Currently, a smart device may perform a corresponding operation based on a received to-be-processed event, but the smart device cannot actively cooperate with another device to jointly complete the to-be-processed event. For example, it is assumed that when a smartphone detects an incoming call, the smartphone rings to remind a user about the incoming call. If the smartphone is not located around the user, the user cannot hear the ring of the smartphone, and the smartphone cannot actively cooperate with another device to notify the user of the incoming call.

Therefore, after the smart device receives the to-be-processed event, how the smart device actively cooperates with the another device to jointly complete the to-be-processed event is a technical problem that urgently needs to be resolved currently.

SUMMARY

Embodiments of this application provide a device cooperation method, an apparatus, and a system, so that a smart device can actively cooperate with another device to jointly complete a to-be-processed event.

The embodiments of this application include the following.

According to a first aspect, an embodiment of this application provides a device cooperation method. The method is applied to a primary device, the primary device pre-establishes communication connections to a plurality of secondary devices, and the method includes: The primary device receives a to-be-processed event. The primary device recognizes an event type and event information of the to-be-processed event. The primary device obtains device information of each of the plurality of secondary devices. The primary device obtains a device filtering condition corresponding to the event type, where the device filtering condition is used to indicate device information of a secondary device matching the event type. The primary device determines, based on the device information of each of the plurality of secondary devices, a first secondary device that meets the device filtering condition. The primary device sends the event type and the event information to the first secondary device when the primary device determines that a data type of the event information is a data type supported by the first secondary device.

In the first aspect, the primary device obtains the device information of each of the plurality of secondary devices, obtains the device filtering condition corresponding to the event type, then selects, from the plurality of secondary devices based on the obtained device information and the obtained device filtering condition, the first secondary device suitable for presenting the event type of the to-be-processed event, and sends the event information to the first secondary device, so that the first secondary device assists the primary device in presenting the event information. According to the device cooperation method provided in this embodiment of this application, the primary device can actively cooperate with another secondary device to jointly complete the to-be-processed event, so that an actual requirement of the user is met better.

In an embodiment, that the primary device sends the event type and the event information to the first secondary device includes: The primary device encrypts the event type and the event information to obtain encrypted data; and the primary device sends the encrypted data to the first secondary device. The primary device encrypts the event type and the event information, so that data transmission security can be improved.

In an embodiment, after the primary device determines, based on the device information of the plurality of secondary devices, the first secondary device that meets the filtering condition, the method further includes: When the primary device determines that the data type of the event information is a data type not supported by the first secondary device, the primary device converts the event information into a data type supported by the first secondary device, to obtain target data; and the primary device sends the event type and the target data to the first secondary device. It can be ensured that the target data sent by the primary device to the first secondary device has a data type supported by the first secondary device.

In an embodiment, when the data type supported by the first secondary device is an audio type and the event type is a notification-type event, the target data is audio data; when the data type supported by the first secondary device is an audio type and the event type is a music playing event, the target data is audio data; or when the data type supported by the first secondary device is an instruction type and the event type is a notification-type event, the target data is a control instruction.

In an embodiment, that the primary device sends the event type and the target data to the first secondary device includes: The primary device encrypts the event type and the target data to obtain encrypted data; and the primary device sends the encrypted data to the first secondary device. The primary device encrypts the event type and the target data, so that data transmission security can be improved.

In an embodiment, the device information includes an operating status of the secondary device, an output capability of the secondary device, and a distance between the secondary device and a user.

In an embodiment, when the event type is a notification-type event, the device filtering condition includes: the secondary device is in a power-on state, the distance between the secondary device and the user is less than a threshold, and the secondary device has an output capability of displaying an image, outputting a sound, or vibration; when the event type is a video playing event, the device filtering condition includes: the secondary device is in a power-on state, the distance between the secondary device and the user is less than a threshold, and the secondary device has an output capability of displaying an image and outputting a sound; or when the event type is a music playing event, the device filtering condition includes: the secondary device is in a power-on state, the distance between the secondary device and the user is less than a threshold, and the secondary device has an output capability of outputting a sound.

In an embodiment, the to-be-processed event is a notification-type event, a speech instruction, or a screen touch instruction.

In an embodiment, that the primary device obtains device information of each of the plurality of secondary devices includes: The primary device sends a device information obtaining instruction to each of the plurality of secondary devices; and the primary device receives the device information sent by each of the plurality of secondary devices.

According to a second aspect, an embodiment of this application provides a device cooperation method. The method is applied to an intermediate device, the intermediate device pre-establishes communication connections to one primary device and a plurality of secondary devices, and the method includes: The intermediate device receives a to-be-processed event sent by the primary device. The intermediate device recognizes an event type and event information of the to-be-processed event. The intermediate device obtains device information of each of the plurality of secondary devices. The intermediate device obtains a device filtering condition corresponding to the event type, where the device filtering condition is used to indicate device information of a secondary device matching the event type. The intermediate device determines, based on the device information of each of the plurality of secondary devices, a first secondary device that meets the device filtering condition. The intermediate device sends the event type and the event information to the first secondary device when the intermediate device determines that a data type of the event information is a data type supported by the first secondary device.

In the second aspect, the intermediate device receives the to-be-processed event sent by the primary device, obtains the device information of each of the plurality of secondary devices, obtains the device filtering condition corresponding to the event type, then selects, from the plurality of secondary devices based on the obtained device information and the obtained device filtering condition, the first secondary device suitable for presenting the event type of the to-be-processed event, and sends the event information to the first secondary device, so that the first secondary device assists the primary device in presenting the event information. According to the device cooperation method provided in this embodiment of this application, the intermediate device can assist the primary device to actively cooperate with another secondary device to jointly complete the to-be-processed event, so that an actual requirement of the user is met better.

According to a third aspect, an embodiment of this application provides a primary device. The primary device pre-establishes communication connections to a plurality of secondary devices, the primary device includes a processor and a memory, the memory is configured to store instructions, and the processor is configured to execute the instructions stored in the memory. The processor is configured to: receive a to-be-processed event; recognize an event type and event information of the to-be-processed event; obtain device information of each of the plurality of secondary devices; obtain a device filtering condition corresponding to the event type, where the device filtering condition is used to indicate device information of a secondary device matching the event type; determine, based on the device information of each of the plurality of secondary devices, a first secondary device that meets the device filtering condition; and send the event type and the event information to the first secondary device when determining that a data type of the event information is a data type supported by the first secondary device.

In the third aspect, the processor of the primary device obtains the device information of each of the plurality of secondary devices, obtains the device filtering condition corresponding to the event type, then selects, from the plurality of secondary devices based on the obtained device information and the obtained device filtering condition, the first secondary device suitable for presenting the event type of the to-be-processed event, and sends the event information to the first secondary device, so that the first secondary device assists the primary device in presenting the event information. The processor of the primary device can enable the primary device to actively cooperate with another secondary device to jointly complete the to-be-processed event, so that an actual requirement of the user is met better.

In an embodiment, the processor is specifically configured to: encrypt the event type and the event information to obtain encrypted data; and send the encrypted data to the first secondary device.

In an embodiment, the processor is further configured to: when determining that the data type of the event information is a data type not supported by the first secondary device, convert the event information into a data type supported by the first secondary device, to obtain target data; and send the event type and the target data to the first secondary device.

In an embodiment, when the data type supported by the first secondary device is an audio type and the event type is a notification-type event, the target data is audio data; when the data type supported by the first secondary device is an audio type and the event type is a music playing event, the target data is audio data; or when the data type supported by the first secondary device is an instruction type and the event type is a notification-type event, the target data is a control instruction.

In an embodiment, the processor is specifically configured to: encrypt the event type and the target data to obtain encrypted data; and send the encrypted data to the first secondary device.

In an embodiment, the device information includes an operating status of the secondary device, an output capability of the secondary device, and a distance between the secondary device and a user.

In an embodiment, when the event type is a notification-type event, the device filtering condition includes: the secondary device is in a power-on state, the distance between the secondary device and the user is less than a threshold, and the secondary device has an output capability of displaying an image, outputting a sound, or vibration; when the event type is a video playing event, the device filtering condition includes: the secondary device is in a power-on state, the distance between the secondary device and the user is less than a threshold, and the secondary device has an output capability of displaying an image and outputting a sound; or when the event type is a music playing event, the device filtering condition includes: the secondary device is in a power-on state, the distance between the secondary device and the user is less than a threshold, and the secondary device has an output capability of outputting a sound.

In an embodiment, the to-be-processed event is a notification-type event, a speech instruction, or a screen touch instruction.

In an embodiment, the processor is specifically configured to: send a device information obtaining instruction to each of the plurality of secondary devices; and receive the device information sent by each of the plurality of secondary devices.

According to the fourth aspect, an embodiment of this application provides an intermediate device. The intermediate device pre-establishes communication connections to one primary device and a plurality of secondary devices, the intermediate device includes a processor and a memory, the memory is configured to store instructions, and the processor is configured to execute the instructions stored in the memory. The processor is configured to: receive a to-be-processed event sent by the primary device; recognize an event type and event information of the to-be-processed event; obtain device information of each of the plurality of secondary devices; obtain a device filtering condition corresponding to the event type, where the device filtering condition is used to indicate device information of a secondary device matching the event type; determine, based on the device information of each of the plurality of secondary devices, a first secondary device that meets the device filtering condition; and send the event type and the event information to the first secondary device when determining that a data type of the event information is a data type supported by the first secondary device.

In the fourth aspect, the processor of the intermediate device receives the to-be-processed event sent by the primary device, obtains the device information of each of the plurality of secondary devices, obtains the device filtering condition corresponding to the event type, then selects, from the plurality of secondary devices based on the obtained device information and the obtained device filtering condition, the first secondary device suitable for presenting the event type of the to-be-processed event, and sends the event information to the first secondary device, so that the first secondary device assists the primary device in presenting the event information. The processor of the intermediate device can assist the primary device to actively cooperate with another secondary device to jointly complete the to-be-processed event, so that an actual requirement of the user is met better.

According to a fifth aspect, an embodiment of this application provides a system. The system includes a primary device and a plurality of secondary devices. The primary device pre-establishes communication connections to the plurality of secondary devices. The primary device is configured to: receive a to-be-processed event; recognize an event type and event information of the to-be-processed event; obtain device information of each of the plurality of secondary devices; obtain a device filtering condition corresponding to the event type, where the device filtering condition is used to indicate device information of a secondary device matching the event type; determine, based on the device information of each of the plurality of secondary devices, a first secondary device that meets the device filtering condition; and send the event type and the event information to the first secondary device when determining that a data type of the event information is a data type supported by the first secondary device. The first secondary device is configured to: receive the event type and the event information that are sent by the primary device, and present the event information based on the event type.

In the fifth aspect, the primary device obtains the device information of each of the plurality of secondary devices, obtains the device filtering condition corresponding to the event type, then selects, from the plurality of secondary devices based on the obtained device information and the obtained device filtering condition, the first secondary device suitable for presenting the event type of the to-be-processed event, and sends the event information to the first secondary device, so that the first secondary device assists the primary device in presenting the event information. The primary device can actively cooperate with another secondary device to jointly complete the to-be-processed event, so that an actual requirement of the user is met better.

In an embodiment, the primary device is specifically configured to: encrypt the event type and the event information to obtain encrypted data; and send the encrypted data to the first secondary device.

In an embodiment, the primary device is further configured to: when determining that the data type of the event information is a data type not supported by the first secondary device, convert the event information into a data type supported by the first secondary device, to obtain target data; and send the event type and the target data to the first secondary device.

In an embodiment, when the data type supported by the first secondary device is an audio type and the event type is a notification-type event, the target data is audio data; when the data type supported by the first secondary device is an audio type and the event type is a music playing event, the target data is audio data; or when the data type supported by the first secondary device is an instruction type and the event type is a notification-type event, the target data is a control instruction.

In an embodiment, the primary device is specifically configured to: encrypt the event type and the target data to obtain encrypted data; and send the encrypted data to the first secondary device.

In an embodiment, the device information includes an operating status of the secondary device, an output capability of the secondary device, and a distance between the secondary device and a user.

In an embodiment, when the event type is a notification-type event, the device filtering condition includes: the secondary device is in a power-on state, the distance between the secondary device and the user is less than a threshold, and the secondary device has an output capability of displaying an image, outputting a sound, or vibration; when the event type is a video playing event, the device filtering condition includes: the secondary device is in a power-on state, the distance between the secondary device and the user is less than a threshold, and the secondary device has an output capability of displaying an image and outputting a sound; or when the event type is a music playing event, the device filtering condition includes: the secondary device is in a power-on state, the distance between the secondary device and the user is less than a threshold, and the secondary device has an output capability of outputting a sound.

In an embodiment, the to-be-processed event is a notification-type event, a speech instruction, or a screen touch instruction.

In an embodiment, the primary device is specifically configured to: send a device information obtaining instruction to each of the plurality of secondary devices; and receive the device information sent by each of the plurality of secondary devices.

According to a sixth aspect, an embodiment of this application provides a system. The system includes a primary device, an intermediate device, and a plurality of secondary devices. The primary device, the intermediate device, and the plurality of secondary devices pre-establish communication connections to each other. The primary device is configured to: receive a to-be-processed event, and send the to-be-processed event to the intermediate device. The intermediate device is configured to: receive the to-be-processed event sent by the primary device; recognize an event type and event information of the to-be-processed event; obtain device information of each of the plurality of secondary devices; obtain a device filtering condition corresponding to the event type, where the device filtering condition is used to indicate device information of a secondary device matching the event type; determine, based on the device information of each of the plurality of secondary devices, a first secondary device that meets the device filtering condition; and send the event type and the event information to the first secondary device when determining that a data type of the event information is a data type supported by the first secondary device. The first secondary device is configured to: receive the event type and the event information that are sent by the intermediate device; and present the event information based on the event type.

In the sixth aspect, the intermediate device receives the to-be-processed event sent by the primary device, obtains the device information of each of the plurality of secondary devices, obtains the device filtering condition corresponding to the event type, then selects, from the plurality of secondary devices based on the obtained device information and the obtained device filtering condition, the first secondary device suitable for presenting the event type of the to-be-processed event, and sends the event information to the first secondary device, so that the first secondary device assists the primary device in presenting the event information. The intermediate device can assist the primary device to actively cooperate with another secondary device to jointly complete the to-be-processed event, so that an actual requirement of the user is met better.

DESCRIPTION OF EMBODIMENTS

Figure 1:
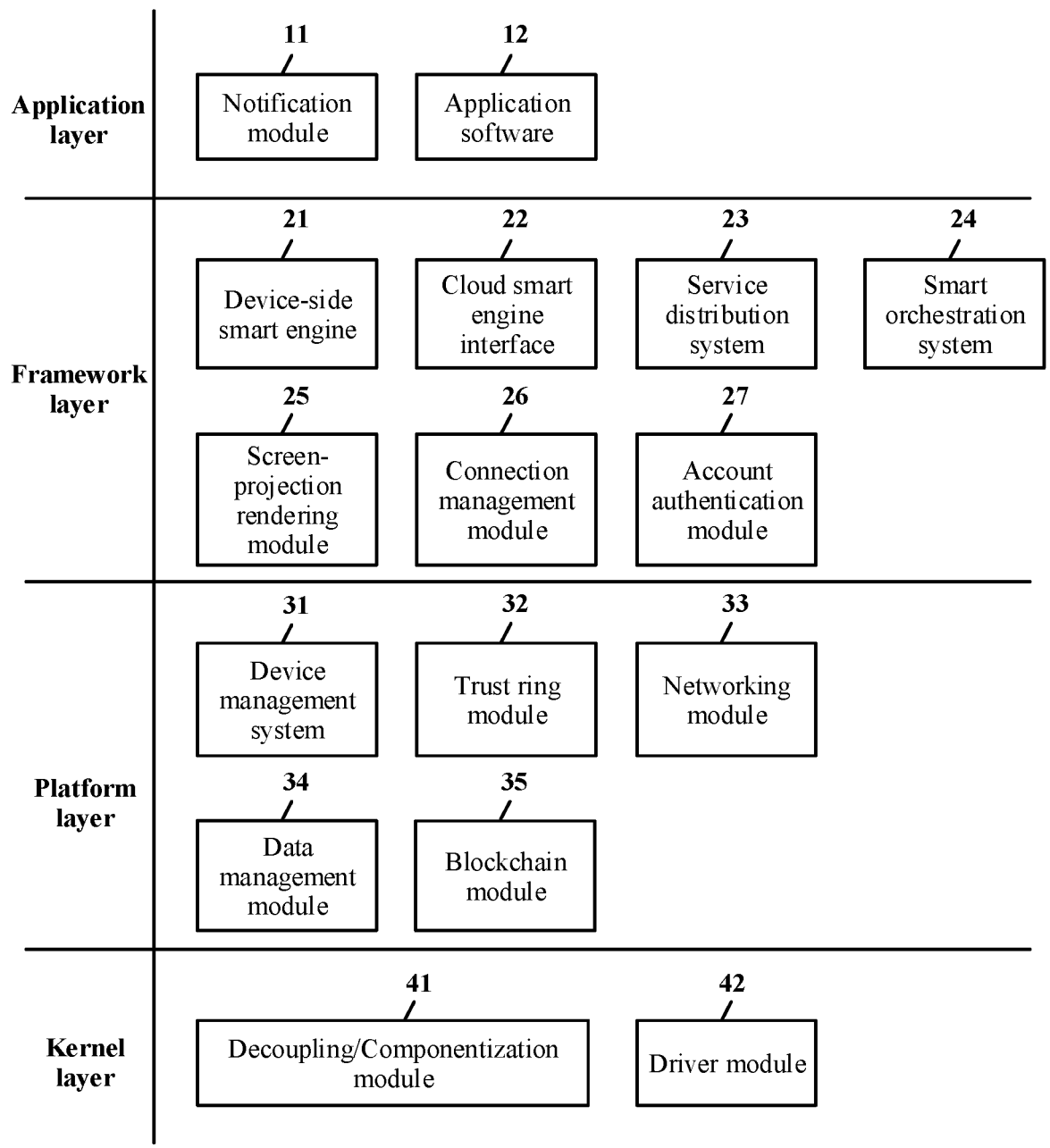
FIG. 1 is a framework diagram of a rich device according to an embodiment of this application.

Embodiments of this application provide a device cooperation method and an apparatus, to resolve a problem described in the background, so that a smart device can actively cooperate with another smart device to jointly complete a to-be-processed event, and an actual requirement of a user is met better. The smart device in the embodiments of this application may be a device such as a smartphone, a tablet computer, a smart television, a smart speaker, a smart band, a smart watch, a smart refrigerator, or a Bluetooth headset. Certainly, the smart device in the embodiments of this application is not limited to the foregoing devices, and may be another device that has not been described.

In the embodiments of this application, smart devices may be classified into three types based on a cooperation relationship: a primary device, an intermediate device, and a secondary device. The primary device may be further classified into an autonomous primary device and a non-autonomous primary device. The autonomous primary device is configured to: receive a to-be-processed event, and select a suitable secondary device depending on a computing capability of the autonomous primary device. The non-autonomous primary device is configured to: receive a to-be-processed event, and select a suitable secondary device depending on a computing capability of the intermediate device. The intermediate device is configured to: assist the non-autonomous primary device to select the suitable secondary device. The secondary device is configured to cooperate with the autonomous primary device or the non-autonomous primary device to complete the to-be-processed event. In addition, a cloud server and some smart devices having strong computing capabilities may be used as intermediate devices. Certainly, the autonomous primary device may alternatively select, jointly with the intermediate device, a suitable secondary device based on a computing capability of the autonomous primary device.

In the embodiments of this application, smart devices may be classified into two types based on a computing capability: a rich device and a lite device. The rich device is a smart device having a relatively high computing capability, and the lite device is a smart device having a relatively low computing capability. For example, the rich device may be a device having a relatively high computing capability such as a smartphone, a tablet computer, or a smart television, and the lite device may be a device having a relatively low computing capability such as a smart speaker, a smart band, a smart watch, a smart refrigerator, or a Bluetooth headset.

When the rich device is used as an autonomous primary device, because the rich device has a relatively high computing capability, the rich device can find a suitable secondary device depending on the computing capability of the rich device. For example, a smartphone is a rich device. When the smartphone is used as an autonomous primary device, because a processor of the smartphone has a relatively high computing capability, the smartphone can quickly find a suitable secondary device depending on the processor of the smartphone.

When the lite device is used as a non-autonomous primary device, because the lite device has a relatively low computing capability, the lite device needs to depend on an intermediate device to find a suitable secondary device. For example, a smart band is a lite device. When the smart band is used as a non-autonomous primary device, because a processor of the smart band has a relatively low computing capability, the smart band needs to rely on a cloud server or a processor of a rich device to quickly find a suitable secondary device.

Table 1 shows several scenarios in which there are the autonomous primary device, the non-autonomous primary device, the intermediate device, and the secondary device.

TABLE 1

| Scenario No. | Autonomous primary device | Non-autonomous primary device | Intermediate device | Secondary device |
|---|---|---|---|---|
| Scenario 1 | Rich device | — | N/A | Rich device, lite device |
| Scenario 2 | Rich device | — | Cloud server | Rich device, lite device |
| Scenario 3 | — | Lite device | Cloud server | Rich device, lite device |
| Scenario 4 | — | Lite device | Rich device | Rich device, lite device |
| . . . | . . . | . . . | . . . | . . . |

In the scenario 1 in Table 1, the autonomous primary device is a rich device. When the autonomous primary device may find a suitable secondary device depending on a computing capability of the autonomous primary device, the autonomous primary device does not need assistance from an intermediate device. For example, when a smartphone receives an incoming call, the smartphone finds, depending on a computing capability of the smartphone, a smart television, a smart speaker, and a smart band that are suitable for reminding a user about the incoming call, and the smartphone separately sends incoming call information in different forms to the smart television, the smart speaker, and the smart band. The smart television may display the incoming call information on the screen to notify the user of the incoming call. The smart speaker may play the incoming call information through the speaker to notify the user of the incoming call. The smart band may vibrate to notify the user of the incoming call. In this scenario, the smartphone is an autonomous primary device, and the smart television, the smart speaker, the smart band are secondary devices, both the smartphone and the smart television are rich devices, and both the smart speaker and the smart band are lite devices.

In the scenario 2 in Table 1, the autonomous primary device is a rich device, and the autonomous primary device and the intermediate device cooperate to find a suitable secondary device. For example, when a user inputs a speech instruction "Watch the movie ABC" to a smartphone, if the smartphone cannot recognize the speech instruction depending on a computing capability of the smartphone, the smartphone needs assistance from a cloud server to recognize the speech instruction. When the cloud server recognizes that information corresponding to the speech instruction is "Watch the movie ABC", the cloud server sends the information "Watch the movie ABC" to the smartphone. In this case, the smartphone finds, depending on the computing capability of the smartphone, a smart television that is suitable for playing the movie, and the smart television plays the movie ABC. In this scenario, the smartphone is the autonomous primary device, the cloud server is an intermediate device, the smart television is the secondary device, and both the smartphone and the smart television are rich devices.

In the scenario 3 in Table 1, the non-autonomous primary device is a lite device. The non-autonomous primary device finds a suitable secondary device depending on an intermediate device, where the intermediate device is a cloud server. For example, when a user inputs a speech instruction "Play the music DEF" to a smart band, the smart band sends the speech instruction "Play the music DEF" to the cloud server. When the cloud server recognizes that information corresponding to the speech instruction is "Play the music DEF", the cloud server assists the smart band to find a smart speaker that is suitable for playing music, and sends audio data of the music DEF to the smart speaker, so that the smart speaker plays the audio data of the music DEF. In this scenario, the smart band is the non-autonomous primary device, the cloud server is the intermediate device, the smart speaker is the secondary device, and both the smart speaker and the smart band are lite devices.

In the scenario 4 in Table 1, the non-autonomous primary device is a lite device, and the non-autonomous primary device finds a suitable secondary device depending on an intermediate device, where the intermediate device is a rich device. For example, when a user inputs a speech instruction "Play the music DEF" to a smart band, the smart band sends the speech instruction "Play the music DEF" to a smartphone. When the smartphone recognizes that information corresponding to the speech instruction is "Play the music DEF", the smartphone assists the smart band to find a smart speaker that is suitable for playing music, and sends audio data of the music DEF to the smart speaker, so that the smart speaker plays the audio data of the music DEF. In this scenario, the smart band is the non-autonomous primary device, the smartphone is the intermediate device, the smart speaker is the secondary device, the smartphone is a rich device, and both the smart speaker and the smart band are lite devices.

Certainly, an actual case may not be limited to the four scenarios shown in Table 1, and may be other scenarios.

In the four scenarios shown in Table 1, there may be one or more selected secondary devices. For example, the selected secondary device is at least one rich device or at least one lite device. For another example, the selected secondary devices include at least one rich device and at least one lite device.

The foregoing introduces the rich device, the lite device, and the cloud server. The following describes detailed information about the rich device, the lite device, and the cloud server.

FIG. 1 is a framework diagram of a rich device according to an embodiment of this application. The framework diagram of the rich device shown in FIG. 1 includes an application layer, a framework layer, a platform layer, and a kernel layer. The application layer includes a notification module 11 and application software 12. The framework layer includes a device-side smart engine 21, a cloud smart engine interface 22, a service distribution system 23, a smart orchestration system 24, a screen-projection rendering module 25, a connection management module 26, and an account authentication module 27. The platform layer includes a device management system 31, a trust ring module 32, a networking module 33, a data management module 34, and a blockchain module 35. The kernel layer includes a decoupling/componentization module 41 and a driver module 42.

In the embodiment shown in FIG. 1, the notification module 11 and the application software 12 are configured to: receive a to-be-processed event, and send the to-be-processed event to the device-side smart engine 21. For example, the to-be-processed event may be an incoming call, an alarm clock, or received information on a smartphone, or may be a watch-movie instruction or a listen-to-music instruction input by a user. The device-side smart engine 21 is configured to recognize the to-be-processed event to obtain an event type and event information. For example, when the to-be-processed event is the incoming call, the device-side smart engine 21 may recognize the incoming call to obtain the event type and the event information. The event type is "incoming call", the event information includes a caller name and a call number. The caller name is "Zhang San", and the call number is "12345". The cloud smart engine interface 22 is configured to: send the to-be-processed event to a cloud server when the device-side smart engine 21 cannot recognize the to-be-processed event, so that the cloud server recognizes the to-be-processed event to obtain the event type and the event information; and then receive the event type and the event information that are sent by the cloud server. The service distribution system 23 is configured to: obtain, from the device management system 31, device information of each smart device in a network and a device filtering rule, and select, based on the device information and the device filtering rule, a secondary device suitable for assisting in processing the to-be-processed event. The device management system 31 is configured to: collect the device information of each smart device in the network, and store the device filtering rule. The trust ring module 32 is configured to: encrypt the event information that needs to be sent to the secondary device, and decrypt encrypted information after receiving the encrypted information sent by another smart device. The networking module 33 is configured to: establish a network with another smart device, and implement data transmission.

In the embodiment shown in FIG. 1, when receiving event information sent by another smart device in the network, the smart orchestration system 24 is configured to orchestrate and display the event information. For example, when a smart television receives a caller name and a call number that are sent by a smartphone in the network, the smart orchestration system 24 may display the caller name and the call number on the top of the screen of the smart television according to a preset rule. The screen-projection rendering module 25 is configured to implement image projection on another smart device. The connection management module 26 is configured to manage a communication connection to another smart device. The account authentication module 27 is configured to authenticate and store account information. The data management module 34 is configured to manage data. The blockchain module 35 is configured to implement security of a smart device by using a blockchain technology. The decoupling/componentization module 41 is configured to manage a bottom layer of an operating system. The driver module 42 is configured to manage a driver.

Figure 2:
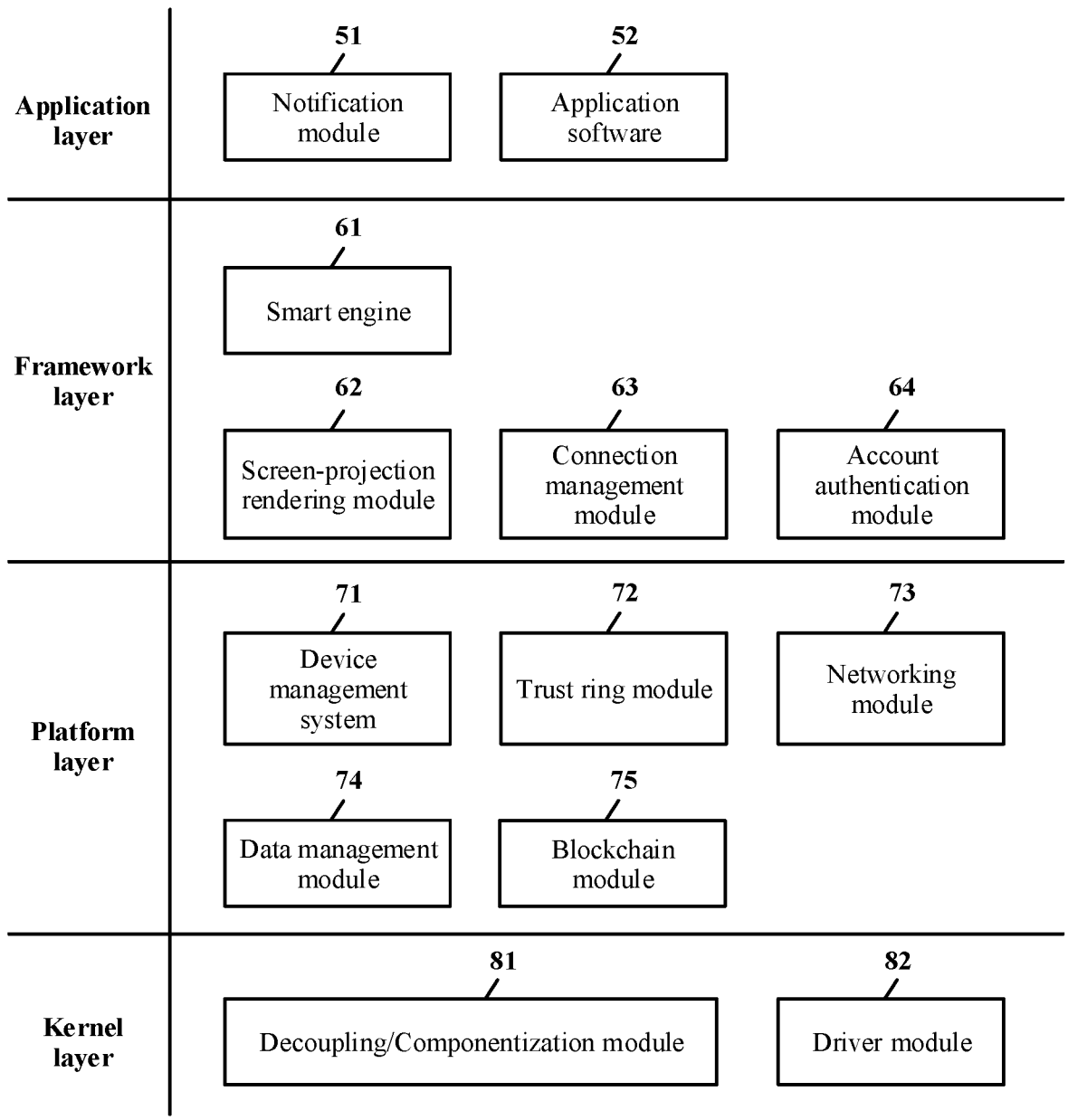
FIG. 2 is a framework diagram of a lite device according to an embodiment of this application.

FIG. 2 is a framework diagram of a lite device according to an embodiment of this application. The framework diagram of the lite device shown in FIG. 2 includes an application layer, a framework layer, a platform layer, and a kernel layer. The application layer includes a notification module 51 and application software 52. The framework layer includes a smart engine 61, a screen-projection rendering module 62, a connection management module 63, and an account authentication module 64. The platform layer includes a device management system 71, a trust ring module 72, a networking module 73, a data management module 74, and a blockchain module 75. The kernel layer includes a decoupling/componentization module 81 and a driver module 82.

In the embodiment shown in FIG. 2, the notification module 51 and the application software 52 are configured to: receive a to-be-processed event, and send the to-be-processed event to the smart engine 61. For example, the to-be-processed event may be an incoming call, an alarm clock, or received information on a smartphone, or may be a watch-movie instruction or a listen-to-music instruction input by a user. The smart engine 61 is configured to send the to-be-processed event to a cloud server. The cloud server selects a secondary device suitable for assisting in processing the to-be-processed event. The device management system 71 is configured to: collect device information of the lite device and store the device information of the lite device. The trust ring module 72 is configured to: encrypt event information that needs to be sent to another smart device, and decrypt encrypted information after receiving the encrypted information sent by another smart device. The networking module 73 is configured to: establish a network with another smart device, and implement data transmission.

In the embodiment shown in FIG. 2, the screen-projection rendering module 62 is configured to implement image projection on another smart device. The connection management module 63 is configured to manage a communication connection to another smart device. The account authentication module 64 is configured to authenticate and store account information. The data management module 74 is configured to manage data. The blockchain module 75 is configured to implement security of a smart device by using a blockchain technology. The decoupling/componentization module 81 is configured to manage a bottom layer of an operating system. The driver module 82 is configured to manage a driver.

It can be learned from FIG. 1 and FIG. 2 that a difference between the rich device and the lite device lies in the framework layer. The rich device has the service distribution system 23 and the smart orchestration system 24 at the framework layer, whereas the lite device has neither the service distribution system 23 nor the smart orchestration system 24. A processor of the rich device has a relatively high computing capability, and can normally run the service distribution system 23 and the smart orchestration system 24. Therefore, the service distribution system 23 and the smart orchestration system 24 can be added to the framework layer of the rich device. A processor of the lite device has a relatively low computing capability. Even if the service distribution system 23 and the smart orchestration system 24 are added to the framework layer of the lite device, the lite device cannot normally run the service distribution system 23 and the smart orchestration system 24. Therefore, the service distribution system 23 and the smart orchestration system 24 are not added to the framework layer of the lite device.

Figure 3:
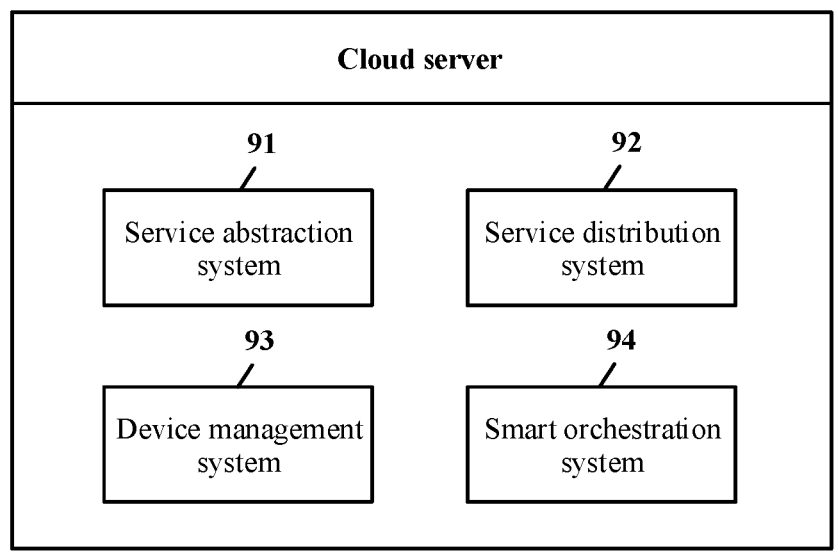
FIG. 3 is a framework diagram of a cloud server according to an embodiment of this application.

FIG. 3 is a framework diagram of a cloud server according to an embodiment of this application. The framework diagram of the cloud server shown in FIG. 3 includes a service abstraction system 91, a service distribution system 92, a device management system 93, and a smart orchestration system 94.

In the embodiment shown in FIG. 3, the service abstraction system 91 is configured to: receive a to-be-processed event sent by a smart device, and recognize the to-be-processed event to obtain an event type and event information. The service distribution system 92 is configured to: obtain, from the device management system 93, device information of each smart device in an ad hoc network and a device filtering rule, and select, based on the device information and the device filtering rule, a secondary device suitable for assisting in processing the to-be-processed event. The device management system 93 is configured to: collect the device information of each smart device, and store the device filtering rule. When the found secondary device does not have a capability of orchestrating the event information, the smart orchestration system 94 needs to orchestrate the event information to obtain text data, audio data, a vibration instruction, or the like, and send the text data, the audio data, or the vibration instruction to the secondary device.

Figure 4:
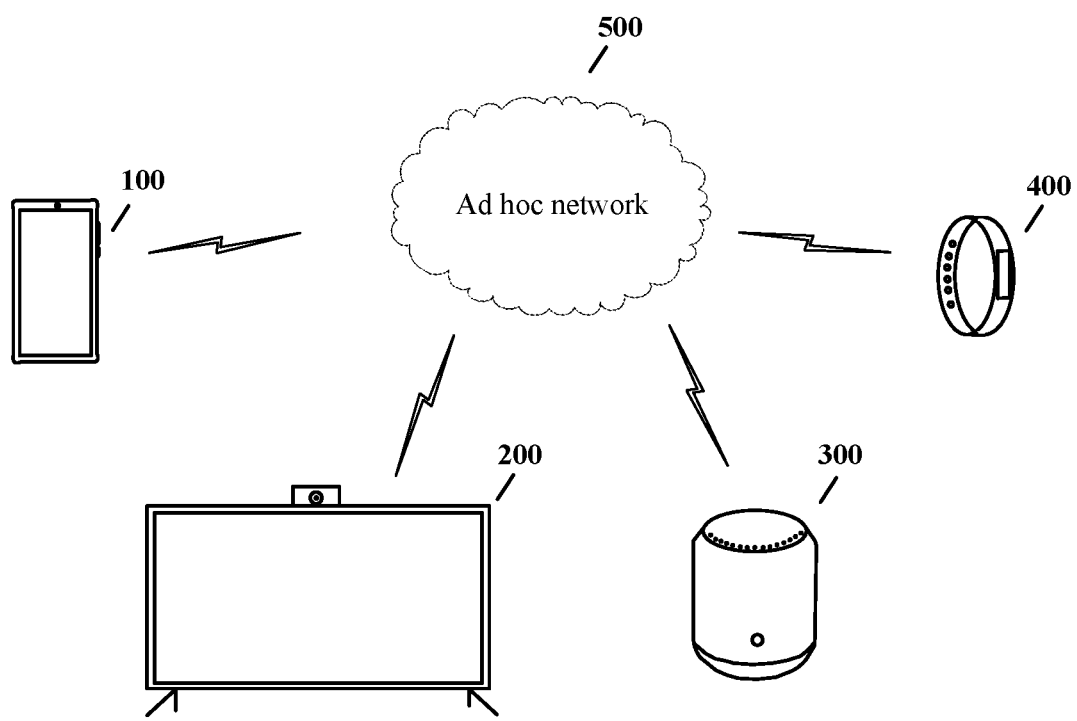
FIG. 4 is a schematic diagram of an application scenario according to an embodiment of this application.

FIG. 4 is a schematic diagram of an application scenario according to an embodiment of this application. The application scenario shown in FIG. 4 is the scenario 1 in Table 1. Smart devices in the application scenario shown in FIG. 4 include a smartphone 100, a smart television 200, a smart speaker 300, and a smart band 400. The four smart devices shown in FIG. 4 may communicate with each other through a pre-established ad hoc network 500. The smartphone 100 in FIG. 4 is the autonomous primary device in the scenario 1 in Table 1. The smartphone 100 and the smart television 200 are rich devices. For an internal architecture of each of the smartphone 100 and the smart television 200, refer to the framework diagram of the rich device shown in FIG. 1. The smart speaker 300 and the smart band 400 are lite devices. For an internal architecture of each of the smart speaker 300 and the smart band 400, refer to the framework diagram of the lite device shown in FIG. 2.

In the embodiment shown in FIG. 4, the ad hoc network is a network constituted by a plurality of smart devices through a wireless network. For example, the smartphone 100, the smart television 200, the smart speaker 300, and the smart band 400 may constitute the ad hoc network 500 through a Wi-Fi network. For another example, the smartphone 100, the smart television 200, the smart speaker 300, and the smart band 400 may constitute the ad hoc network 500 through Bluetooth.

In the embodiment shown in FIG. 4, it is assumed that a user has the smartphone 100, the smart television 200, the smart speaker 300, and the smart band 400, the smartphone 100 is located in a bedroom of the user, and the smart television 200, the smart speaker 300, and the smart band 400 are all located in a living room of the user. The user wears the smart band 400 to watch the smart television 200 in the living room. When the smartphone 100 receives an incoming call, the smartphone 100 rings to remind the user about the incoming call. Because the user watches the smart television 200 in the living room, the user does not hear the ringing of the smartphone 100. It is assumed that the smartphone 100 serves as a primary device and finds, depending on a computing capability of the smartphone 100, the smart television 200, the smart speaker 300, and the smart band 400 in the ad hoc network 500 as secondary devices. The smartphone 100 sends incoming call information to the smart television 200 by using the ad hoc network 500, so that the smart television 200 displays the incoming call information through the screen. The smartphone 100 converts the incoming call information into audio data, and sends the audio data to the smart speaker 300 by using the ad hoc network 500, so that the smart speaker 300 plays the audio data through the speaker. The smartphone 100 converts the incoming call information into a vibration instruction, and sends the vibration instruction to the smart band 400 by using the ad hoc network 500, so that the smart band 400 vibrates to present the incoming call on the smartphone 100. In this case, the user may view the incoming call information through the smart television 200, hear the audio data corresponding to the incoming call information through the smart speaker 300, and learn of the incoming call on the smartphone 100 through vibration by the smart band 400.

It can be learned from the embodiment shown in FIG. 4 that, when the smartphone 100 receives the incoming call, even if the user does not hear the ringing of the incoming call on the smartphone 100, the user may learn of an incoming call event of the smartphone 100 by using a smart device in the ad hoc network 500. The smart device provided in this embodiment of this application may actively cooperate with another device to jointly complete the to-be-processed event, so that an actual requirement of the user is met.

In the embodiment shown in FIG. 4, a condition that the smartphone 100 starts to find a secondary device may be preset. For example, the condition that the smartphone 100 starts to find a secondary device may be set as follows: When the smartphone 100 receives an incoming call, the smartphone 100 starts to find a secondary device. For another example, the condition that the smartphone 100 starts to find a secondary device may be set as follows: When the smartphone 100 receives an incoming call and does not answer the incoming call within 10 seconds, the smartphone 100 starts to find a secondary device.

Figure 5:
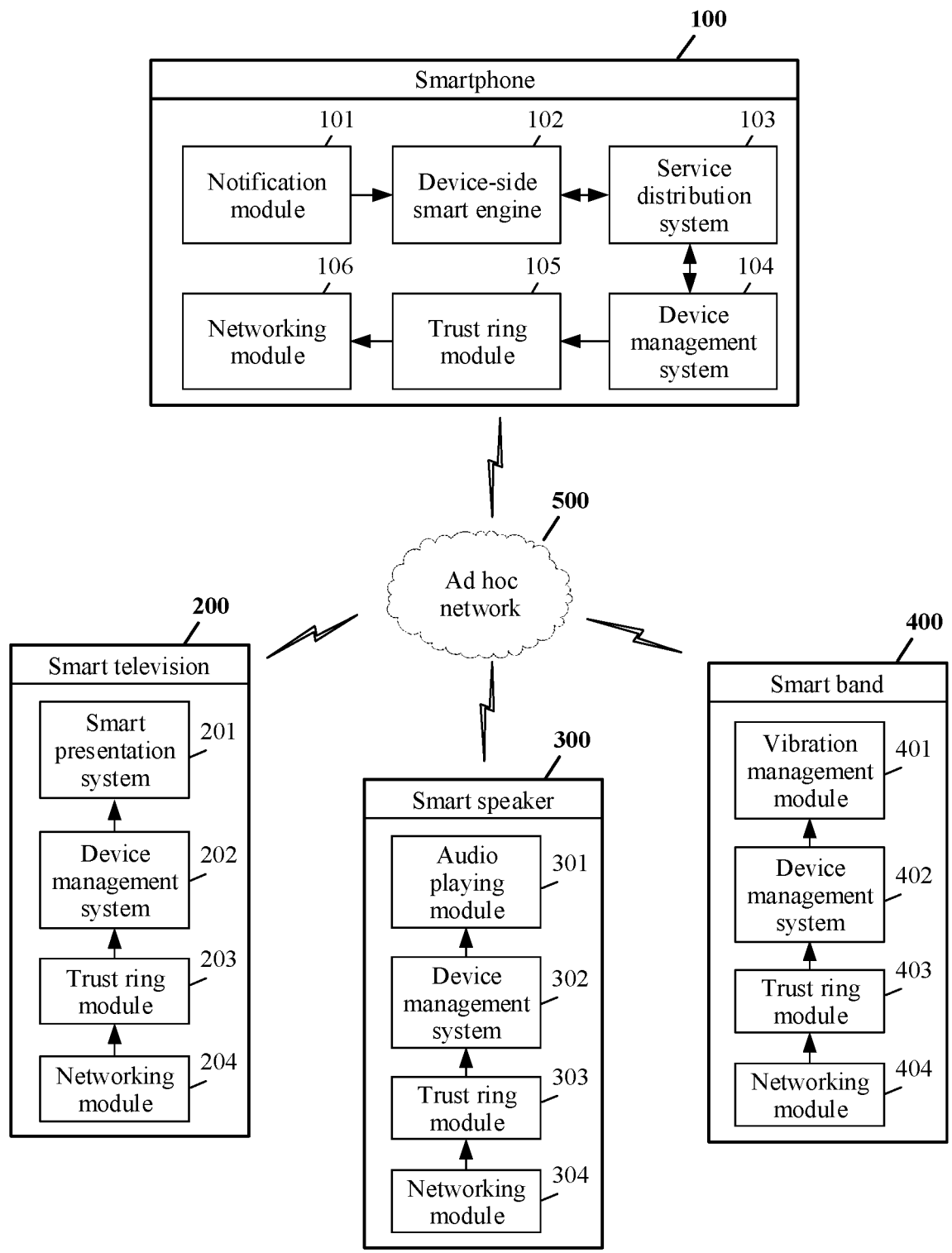
FIG. 5 is a diagram of an internal structure of each smart device in FIG. 4.
Figure 6:
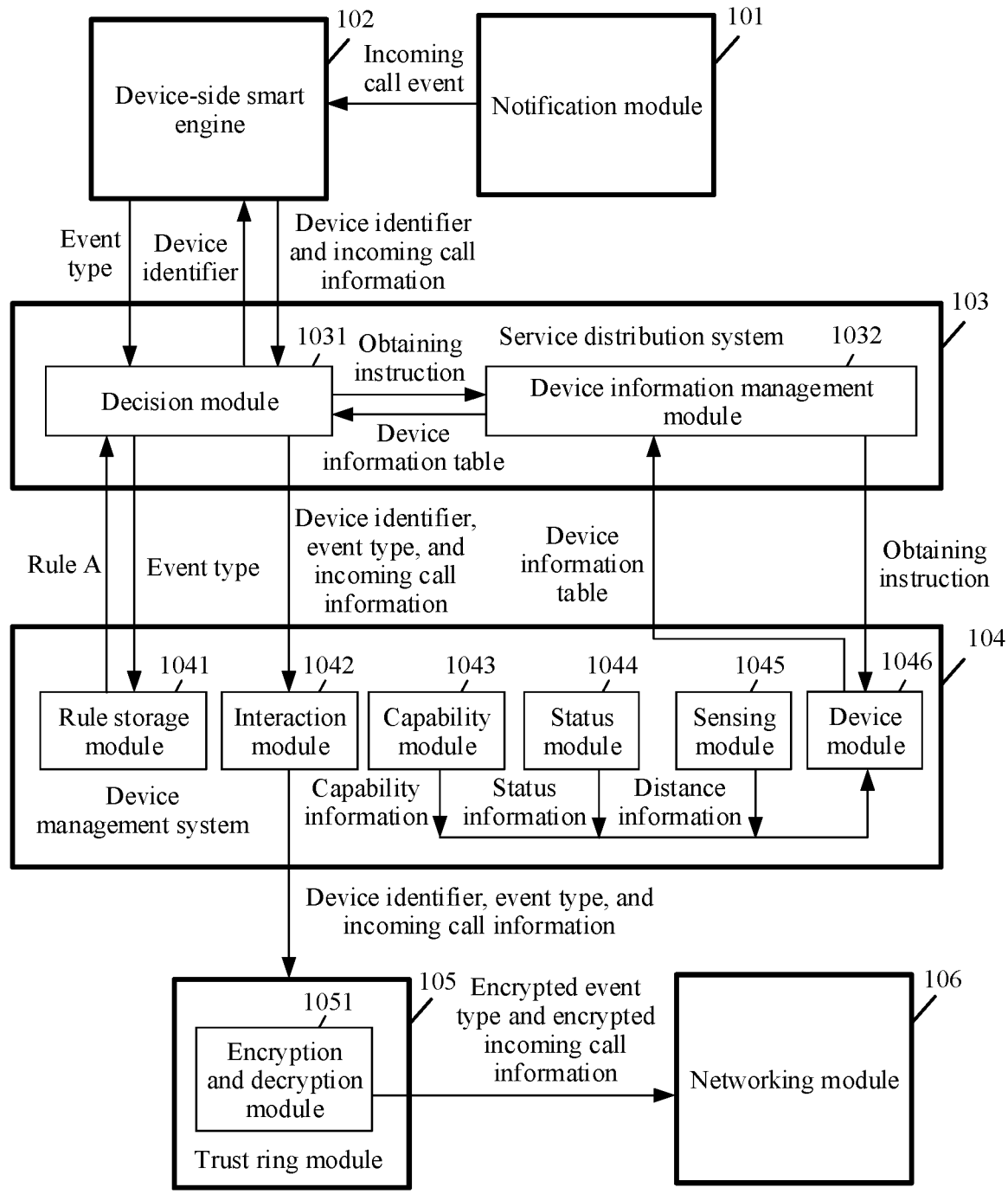
FIG. 6 is a detailed structural diagram of a smartphone 100 in FIG. 4.

FIG. 5 is a diagram of an internal structure of each smart device in FIG. 4. FIG. 6 is a detailed structural diagram of a smartphone 100 in FIG. 4. In the embodiment shown in FIG. 5 and FIG. 6, the smartphone 100 includes a notification module 101, a device-side smart engine 102, a service distribution system 103, a device management system 104, a trust ring module 105, and a networking module 106. The service distribution system 103 includes a decision module 1031 and a device information management module 1032. The device management system 104 includes a rule storage module 1041, an interaction module 1042, a capability module 1043, a status module 1044, a sensing module 1045, and a device module 1046. The trust ring module 105 includes an encryption and decryption module 1051. The smart television 200 includes a smart presentation system 201, a device management system 202, a trust ring module 203, and a networking module 204. The smart speaker 300 includes an audio playing module 301, a device management system 302, a trust ring module 303, and a networking module 304. The smart band 400 includes a vibration management module 401, a device management system 402, a trust ring module 403, and a networking module 404.

In the embodiment shown in FIG. 5 and FIG. 6, the device management system 104, the device management system 202, the device management system 302, and the device management system 402 have basically the same internal structures and function implementations. The trust ring module 105, the trust ring module 203, the trust ring module 303, and the trust ring module 403 have basically the same internal structures and function implementations. The networking module 106, the networking module 204, the networking module 304, and the networking module 404 have basically the same internal structures and function implementations.

In the embodiment shown in FIG. 5 and FIG. 6, a function of the notification module 101 shown in FIG. 5 and FIG. 6 is the same as a function of the notification module 11 shown in FIG. 1, a function of the device-side smart engine 102 shown in FIG. 5 and FIG. 6 is the same as a function of the device-side smart engine 21 shown in FIG. 1, a function and an internal structure of the service distribution system 103 shown in FIG. 5 and FIG. 6 are the same as a function and an internal structure of the service distribution system 23 shown in FIG. 1, a function and an internal structure of the device management system 104 shown in FIG. 5 and FIG. 6 are the same as a function and an internal structure of the device management system 31 shown in FIG. 1, a function and an internal structure of the trust ring module 105 shown in FIG. 5 and FIG. 6 are the same as a function and an internal structure of the trust ring module 32 shown in FIG. 1, and a function of the networking module 106 shown in FIG. 5 and FIG. 6 is the same as a function of the networking module 33 shown in FIG. 1.

With reference to the embodiment shown in FIG. 4 to FIG. 6, the following describes in detail an execution process in which the smartphone 100 notifies the user of an incoming call by using the smart television 200, the smart speaker 300, and the smart band 400. It is assumed that the smartphone 100 is located in the bedroom, the smart television 200, the smart speaker 300, and the smart band 400 are all turned on and located in the living room, and the user wears the smart band 400 to watch the smart television 200 in the living room. When the notification module 101 of the smartphone 100 receives an incoming call event, the notification module 101 sends the incoming call event to the device-side smart engine 102. The device-side smart engine 102 recognizes the incoming call event to obtain an event type and incoming call information, and sends the event type to the decision module 1031 of the service distribution system 103, where the event type is "incoming call", the incoming call information includes a caller name and a call number, the caller name is "Zhang San", and the call number is "12345".

After the decision module 1031 of the service distribution system 103 receives the event type sent by the device-side smart engine 102, the decision module 1031 sends a device information obtaining instruction to the device information management module 1032, where the device information is device information of each smart device in the ad hoc network 500. After the device information management module 1032 receives the device information obtaining instruction, the device information management module 1032 sends the device information obtaining instruction to the device module 1046 of the device management system 104. After the device module 1046 receives the device information obtaining instruction, the device module 1046 collects a device identifier and an output capability of each smart device in the ad hoc network 500 by using the capability module 1043, the device module 1046 collects the device identifier and a current operating status of each smart device in the ad hoc network 500 by using the status module 1044, the device module 1046 collects the device identifier of each smart device in the ad hoc network 500 and a distance between each smart device and the user by using the sensing module 1045, and the device module 1046 constructs a device information table based on the collected device identifier, output capability, current operating status, and distance of each smart device in the ad hoc network 500, and sends the device information table to the device information management module 1032. After the device information management module 1032 receives the device information table sent by the device module 1046, the device information management module 1032 sends the device information table to the decision module 1031. For a specific structure of the device information table, refer to Table 2.

Table 2 shows a device information table. The device information table includes the device identifier, the current operating status, the distance, and the output capability of each smart device in the ad hoc network 500.

TABLE 2

| Device identifier | Current operating status | Distance | Output capability |
|---|---|---|---|
| TV | Power-on state | 2 meters | Display an image and output a sound |
| Speaker | Power-on state | 3 meters | Output a sound |
| Band | Power-on state | 0 | Vibrate |

It can be learned from Table 2 that the device identifier of the smart television 200 is TV, the current operating status of the smart television 200 is power-on state, the distance between the smart television 200 and the user is 2 meters, and the output capability of the smart television 200 is displaying an image and outputting a sound. The device identifier of the smart speaker 300 is Speaker, the current operating status of the smart speaker 300 is power-on state, the distance between the smart speaker 300 and the user is 3 meters, and the output capability of the smart speaker 300 is outputting a sound. The device identifier of the smart band 400 is Band, the current operating status of the smart band 400 is power-on state, the distance between the smart band 400 and the user is 0 meters, and the output capability of the smart band 400 is vibration.

In the embodiment shown in FIG. 4 to FIG. 6, the capability module 1043 in the device management system 104 actively collects the device identifier and the output capability of each smart device in the ad hoc network 500, and stores the device identifier and the output capability of each smart device in the ad hoc network 500. For example, the capability module 1043 of the smartphone 100 sends an output capability obtaining request to the smart television 200, and the capability module of the device management system 202 of the smart television 200 sends the device identifier and the output capability of the smart television 200 to the capability module 1043 of the smartphone 100. The capability module 1043 of the smartphone 100 stores the device identifier and the output capability of each smart device in the ad hoc network 500. Certainly, because the output capability of each smart device in the ad hoc network 500 does not change, an output capability of a same smart device needs to be collected only once.

In the embodiment shown in FIG. 4 to FIG. 6, when the status module 1044 in the device management system 104 receives the obtaining instruction, the status module 1044 collects the device identifier and the current operating status of each smart device in the ad hoc network 500, and stores the device identifier and the current operating status of each smart device in the ad hoc network 500. For example, when the status module 1044 of the smartphone 100 receives an operating status obtaining instruction, the status module 1044 of the smartphone 100 sends the operating status obtaining request to the smart television 200. The status module of the device management system 202 of the smart television 200 sends the device identifier and the current operating status of the smart television to the status module 1044 of the smartphone 100. Then, the status module 1044 of the smartphone 100 further sequentially collects device identifiers and current operating statuses of other smart devices in the ad hoc network 500. Finally, the status module 1044 stores the device identifier and the current operating status of each smart device in the ad hoc network 500.

In the embodiment shown in FIG. 4 to FIG. 6, when the sensing module 1045 of the device management system 104 receives an obtaining instruction, the sensing module 1045 collects the device identifier of each smart device in the ad hoc network 500 and the distance between each smart device and the user, and stores the device identifier of each smart device in the ad hoc network 500 and the distance between each smart device and the user. For example, when the sensing module 1045 of the smartphone 100 receives an operating status obtaining instruction, the sensing module 1045 of the smartphone 100 sends a distance obtaining request to the smart television 200. The sensing module of the device management system 202 of the smart television 200 sends the device identifier of the smart television 200 and the distance between the smart television 200 and the user to the sensing module 1045 of the smartphone 100. Then, the sensing module 1045 of the smartphone 100 further sequentially collects device identifiers of other smart devices in the ad hoc network 500 and distances between the smart devices and the user. Finally, the sensing module 1045 stores the device identifier of each smart device in the ad hoc network 500 and the distance between each smart device and the user.

In the embodiment shown in FIG. 4 to FIG. 6, the decision module 1031 further sends the event type ("incoming call") to the rule storage module 1041. The rule storage module 1041 finds, from a prestored rule table, a rule corresponding to the event type ("incoming call"), and sends the rule corresponding to the event type ("incoming call") to the decision module 1031.

With reference to Table 3, Table 3 shows a rule table prestored in the rule storage module 1041. The rule table is used to indicate a requirement that a secondary device needs to meet.

TABLE 3

| Event type | Requirement |
| --- | --- |
| Incoming call | Rule A: A secondary device is in a power-on state, a distance between the secondary device and a user is less than 5 meters, and the secondary device has an output capability of displaying an image, outputting a sound, or vibration. |
| Received information | Rule B: A secondary device is in a power-on state, a distance between the secondary device and a user is less than 5 meters, and the secondary device has an output capability of displaying an image, outputting a sound, or vibration. |
| Watch a movie | Rule C: A secondary device is in a power-on state, a distance between the secondary device and a user is less than 5 meters, and the secondary device has an output capability of displaying an image and outputting a sound. |
| Listen to music | Rule D: A secondary device is in a power-on state, a distance between the secondary device and a user is less than 5 meters, and the secondary device has an output capability of outputting a sound. |

Table 3 includes two columns: an event type and a rule. The event type and the rule are both predefined. In Table 3, each event type corresponds to three rules. Certainly, both the event type and the rule in Table 3 may be added, modified, and deleted, and content in Table 3 may be defined according to an actual case.

With reference to Table 3, after the rule storage module 1041 receives the event type ("incoming call") sent by the decision module 1031, the rule storage module 1041 searches Table 3 for the rule corresponding to the event type "incoming call". The rule corresponding to "incoming call" is the rule A in Table 3, and the rule storage module 1041 sends the rule A to the decision module 1031.

After the decision module 1031 obtains the device information table shown in Table 2 and the rule A in Table 3, the decision module 1031 may determine a device identifier, in Table 2, that meets the requirement of the rule A. After the determining, the decision module 1031 determines that a device identifier "TV", a device identifier "Speaker", and a device identifier "Band" all meet the requirement of the rule A. Therefore, the smart television 200 corresponding to the device identifier "TV", the smart speaker 300 corresponding to the device identifier "Speaker", and the smart band 400 corresponding to the device identifier "Band" may all be used as secondary devices. After the decision module 1031 determines that the smart television 200, the smart speaker 300, and the smart band 400 in the ad hoc network 500 may all be used as the secondary devices, the decision module 1031 sends the device identifiers (that is, "TV", "Speaker", and "Band") of the secondary devices to the device-side smart engine 102.

The device-side smart engine 102 receives the device identifiers (that is, "TV", "Speaker", and "Band") of the secondary devices sent by the decision module 1031. Then, the device-side smart engine 102 determines whether the secondary device supports a data type of the incoming call information. If the secondary device supports the data type of the incoming call information, it indicates that the secondary device can present the incoming call information. If the secondary device does not support the data type of the incoming call information, it indicates that the secondary device cannot present the incoming call information. In this case, the device-side smart engine 102 needs to convert the incoming call information into a data type supported by the secondary device.

With reference to Table 4, Table 4 shows a correspondence table prestored by the device-side smart engine 102, where the correspondence table indicates a correspondence between a device identifier and a data type supported by a secondary device.

TABLE 4

| Device identifier | Data type supported by a secondary device |
| --- | --- |
| TV | Text data, audio data, and image data |
| Speaker | Audio data |
| Band | Vibration instruction |
| . . . | . . . |

With reference to Table 4, after the device-side smart engine 102 receives the device identifiers (that is, "TV", "Speaker", and "Band") of the secondary devices sent by the decision module 1031, the device-side smart engine 102 looks up Table 4 and learns that a data type corresponding to the device identifier "TV" is "text data, audio data, and image data", the device-side smart engine 102 looks up Table 4 and learns that a data type corresponding to the device identifier "Speaker" is "audio data", and the device-side smart engine 102 looks up Table 4 and learns that a data type corresponding to the device identifier "Band" is "vibration instruction". The device-side smart engine 102 may learn that the data type of the incoming call information (the caller name is "Zhang San", and the call number is "12345")

is text data. Therefore, the device-side smart engine 102 may learn from Table 4 that the smart television 200 corresponding to the device identifier "TV" supports text data and that the smart speaker 300 corresponding to the device identifier "Speaker" and the smart band 400 corresponding to the device identifier "Band" do not support text data. In this case, the device-side smart engine 102 needs to convert the incoming call information into audio data and a vibration instruction, so that the smart speaker 300 and the smart band 400 can recognize the incoming call information. The device-side smart engine 102 sends the device identifiers ("TV", "Speaker", and "Band") and the incoming call information (text data, audio data, and vibration instruction) corresponding to the device identifiers to the decision module 1031. The decision module 1031 sends the device identifiers ("TV", "Speaker", and "Band"), the event type (incoming call), and the incoming call information (text data, audio data, and vibration instruction) corresponding to the device identifiers to the encryption and decryption module 1051 of the trust ring module 105 by using the interaction module 1042.

The encryption and decryption module 1051 separately encrypts the event type (incoming call) and the incoming call information (text data) by using a preset encryption algorithm. For example, the encryption algorithm may be a sha265 encryption algorithm. Certainly, another encryption algorithm may alternatively be used. Then, the encryption and decryption module 1051 sends an encrypted event type (incoming call) and encrypted incoming call information (text data) to the smart television 200 by using the ad hoc network 500 pre-established by the networking module 106. An encryption and decryption module of the trust ring module 203 of the smart television 200 receives, by using the ad hoc network 500 pre-established by the networking module 204, the encrypted event type (incoming call) and the encrypted incoming call information (text data) that are sent by the encryption and decryption module 1051 of the smartphone 100. The encryption and decryption module of the trust ring module 203 decrypts the encrypted event type (incoming call) and the encrypted incoming call information (text data) by using a preset decryption algorithm, to obtain the event type and the incoming call information. The encryption and decryption module of the trust ring module 203 sends the event type and the incoming call information to the smart presentation system 201 by using the device management system 202. The smart presentation system 201 determines, based on the event type, a manner of presenting the incoming call information. For example, assuming that the smart presentation system 201 determines that the event type is "incoming call", the smart presentation system 201 displays the incoming call information on the top of the screen (caller name: "Zhang San", call number: "12345").

In addition, the encryption and decryption module 1051 encrypts the event type (incoming call) and the incoming call information (audio data) by using a preset encryption algorithm. Then, the encryption and decryption module 1051 sends an encrypted event type (incoming call) and encrypted incoming call information (audio data) to the smart speaker 300 by using the ad hoc network 500 pre-established by the networking module 106. An encryption and decryption module of the trust ring module 303 of the smart speaker 300 receives, by using the ad hoc network 500 pre-established by the networking module 304, the encrypted event type (incoming call) and the encrypted incoming call information (audio data) that are sent by the encryption and decryption module 1051 of the smartphone 100. The encryption and decryption module of the trust ring module 303 decrypts the encrypted event type (incoming call) and the encrypted incoming call information (audio data) by using a preset decryption algorithm, to obtain the event type (incoming call) and the incoming call information (audio data). The encryption and decryption module of the trust ring module 303 sends the event type (incoming call) and the incoming call information (audio data) to the audio playing module 301 by using the device management system 302. The audio playing module 301 determines, based on the event type, a manner of presenting the incoming call information. For example, assuming that the audio playing module 301 determines that the event type is "incoming call", the audio playing module 301 plays the incoming call information (audio data) at a volume level of 70%.

In addition, the encryption and decryption module 1051 encrypts the event type (incoming call) and the incoming call information (vibration instruction) by using a preset encryption algorithm. Then, the encryption and decryption module 1051 sends an encrypted event type (incoming call) and encrypted incoming call information (vibration instruction) to the smart band 400 by using the ad hoc network 500 pre-established by the networking module 106. An encryption and decryption module of the trust ring module 403 of the smart band 400 receives, by using the ad hoc network 500 pre-established by the networking module 404, the encrypted event type (incoming call) and the encrypted incoming call information (vibration instruction) that are sent by the encryption and decryption module 1051 of the smartphone 100. The encryption and decryption module of the trust ring module 403 decrypts the encrypted event type (incoming call) and the encrypted incoming call information (vibration instruction) by using a preset decryption algorithm, to obtain the event type (incoming call) and the incoming call information (vibration instruction). The encryption and decryption module of the trust ring module 403 sends the event type (incoming call) and the incoming call information (vibration instruction) to the vibration management module 401 by using the device management system 402. The vibration management module 401 determines, based on the event type, a manner of presenting the incoming call information. For example, assuming that the vibration management module 401 determines that the event type is "incoming call", the vibration management module 401 determines that a vibration manner corresponding to the incoming call is vibrating three times and three seconds each time, and then the vibration management module 401 vibrates by using a motor in the vibration manner corresponding to the incoming call.

In the embodiment shown in FIG. 4 to FIG. 6, the smart band 400 is one of wearable devices. The wearable device further includes a device such as a smartwatch. In the embodiments, the smart band 400 may be replaced with a smartwatch.

In the embodiment shown in FIG. 4 to FIG. 6, the smartphone 100 is the autonomous primary device. After performing filtering, the smartphone 100 finally determines that the smart television 200, the smart speaker 300, and the smart band 400 are secondary devices. The smartphone 100 cooperates with the smart television 200, the smart speaker 300, and the smart band 400 to notify the user of the incoming call. It can be learned from the embodiment shown in FIG. 4 to FIG. 6 that, according to the device cooperation method provided in the embodiments of this application, a smart device can actively cooperate with another smart device to jointly complete a to-be-processed event, so that an actual requirement of the user is met better.

In the embodiment shown in FIG. 4 to FIG. 6, how to calculate the distance between each smart device in the ad hoc network 500 and the user is described below. The smartphone 100, the smart television 200, the smart speaker 300, and the smart band 400 each are equipped with a Bluetooth module, and the user wears the smart band 400. In this scenario, the smart band 400 may detect, by using a distance sensing module, that the user is wearing the smart band 400. Therefore, the distance between the smart band 400 and the user is 0. The user wears the smart band 400. Therefore, provided that distances between the smart band 400 and the smartphone 100, the smart television 200, and the smart speaker 300 are calculated, the distances between the user and the smartphone 100, the smart television 200, and the smart speaker 300 can be obtained. The distance between the smartphone 100 and the smart band 400 may be calculated by using the Bluetooth module of the smartphone 100 and the Bluetooth module of the smart band 400. Similarly, the distance between the smart television 200 and the smart band 400 is calculated by using the Bluetooth module of the smart television 200 and the Bluetooth module of the smart band 400; and the distance between the smart speaker 300 and the smart band 400 is calculated by using the Bluetooth module of the smart speaker 300 and the Bluetooth module of the smart band 400. Certainly, for the smart television 200 having a camera, if the camera of the smart television 200 can photograph a user, the smart television 200 may measure the distance between the smart television 200 and the user by using the camera.

Figure 7:
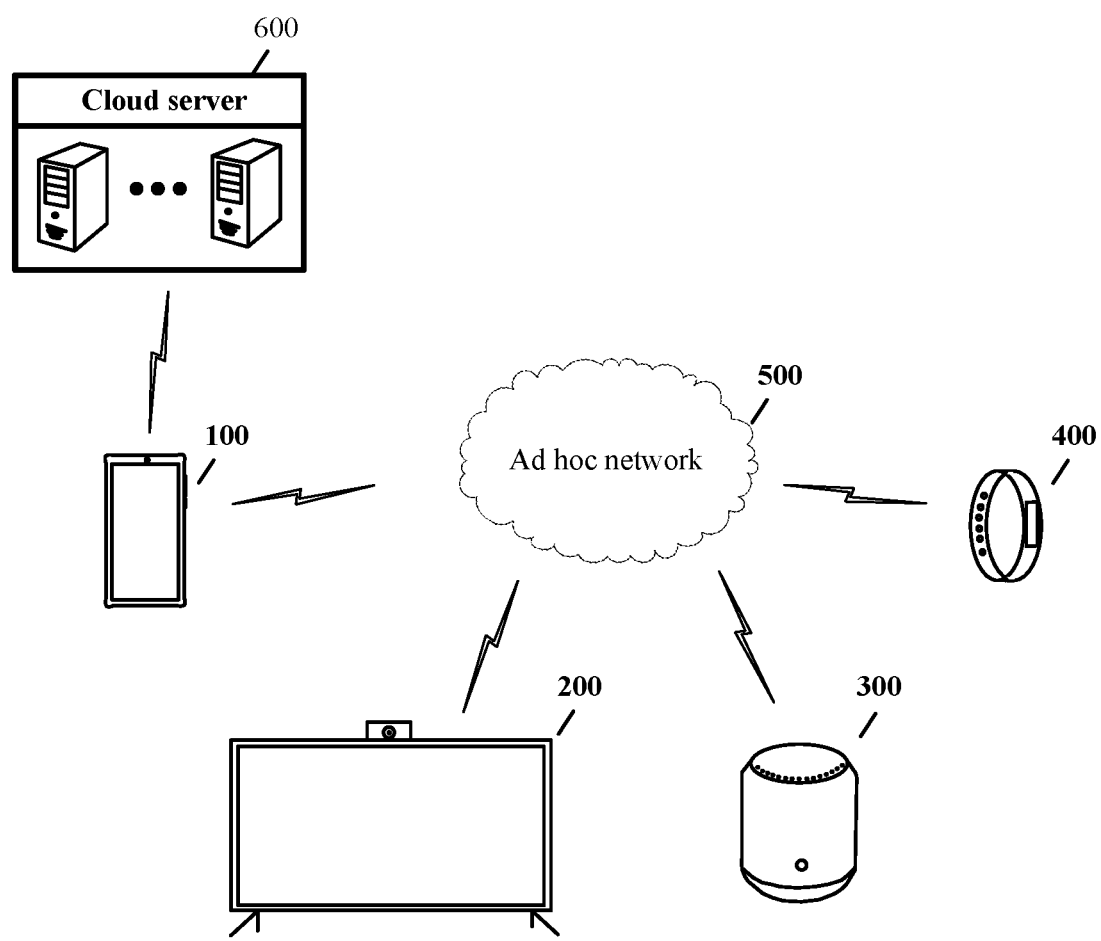
FIG. 7 is a schematic diagram of another application scenario according to an embodiment of this application.
Figure 8:
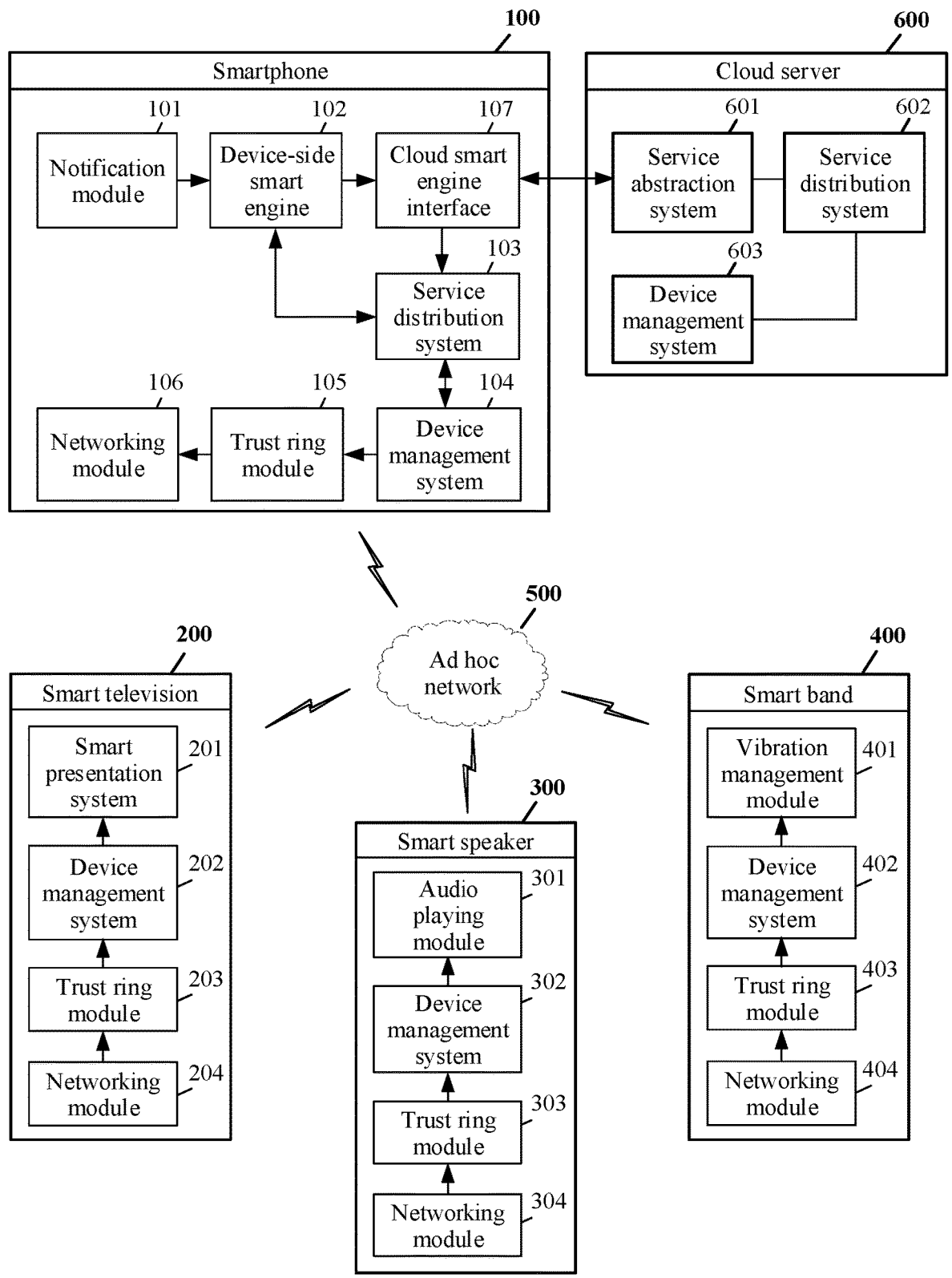
FIG. 8 is a diagram of an internal structure of each smart device and a cloud server 600 in FIG. 7.
Figure 9:
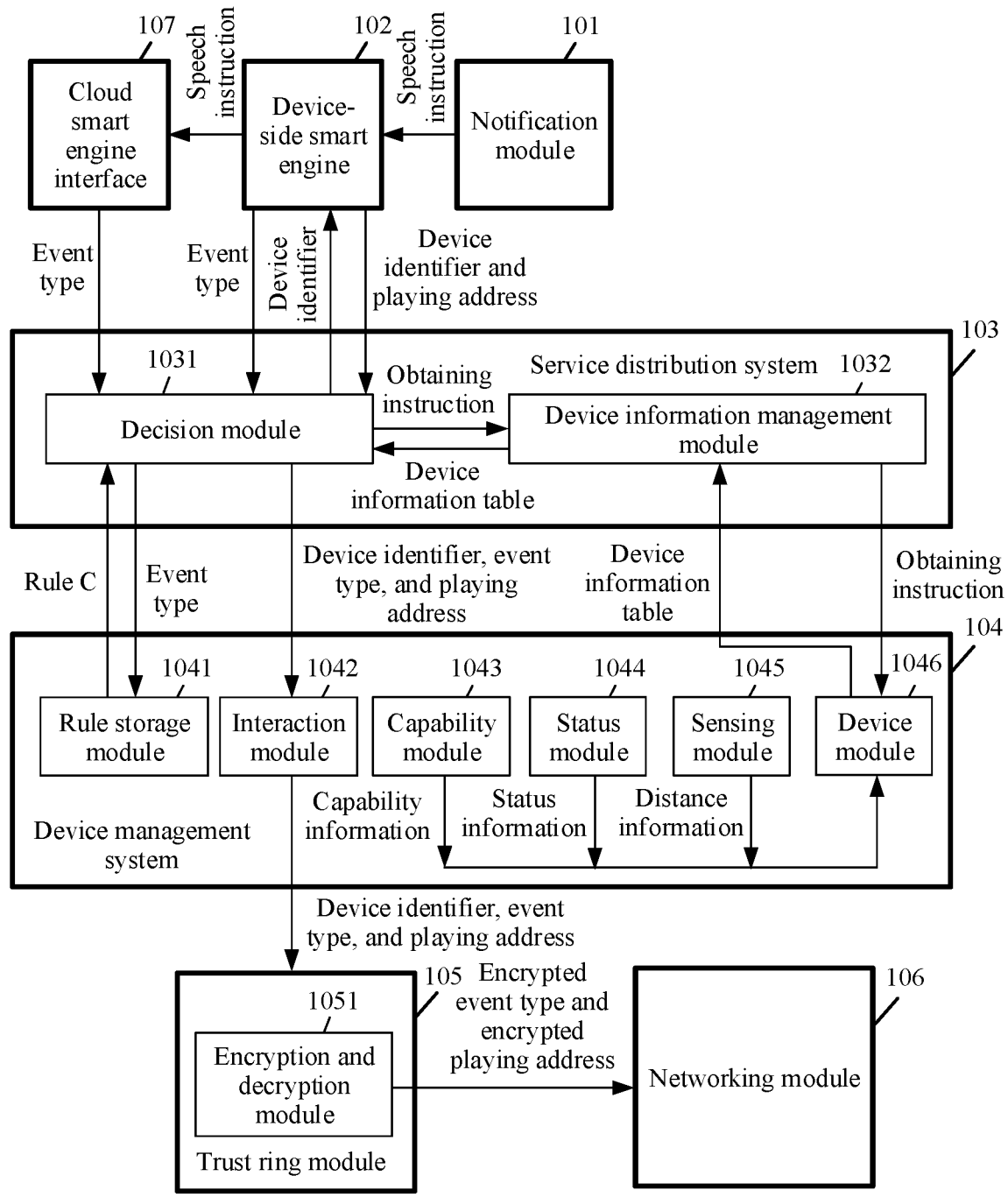
FIG. 9 is a detailed structural diagram of a smartphone 100 in FIG. 7.

FIG. 7 is a schematic diagram of another application scenario according to an embodiment of this application. FIG. 8 is a diagram of internal structures of each smart device and a cloud server 600 in FIG. 7. FIG. 9 is a detailed structural diagram of a smartphone 100 in FIG. 7. The application scenario shown in FIG. 7 is the scenario 2 in Table 1. The application scenario shown in FIG. 7 includes a cloud server 600 and four smart devices. The four smart devices are a smartphone 100, a smart television 200, a smart speaker 300, and a smart band 400. The four smart devices shown in FIG. 7 may communicate with each other by using a pre-established ad hoc network 500. In FIG. 7, the cloud server 600 is added based on the application scenario shown in FIG. 4. The smartphone 100 may communicate with the cloud server 600 by using a mobile network, and the smart television 200, the smart speaker 300, and the smart band 400 may also communicate with the cloud server 600 by using the internet or a mobile network.

In the embodiment shown in FIG. 7 to FIG. 9, it is assumed that a user has the smartphone 100, the smart television 200, the smart speaker 300, and the smart band 400; the smartphone 100, the smart television 200, the smart speaker 300, the smart band 400, and the user are all located in a living room; and the user wears the smart band 400. When the user inputs, to the smartphone 100, a speech instruction for watching the movie ABC in which the actor Li Si stars, a notification module 101 of the smartphone 100 sends the speech instruction for watching the movie ABC in which the actor Li Si stars to a device-side smart engine 102. The device-side smart engine 102 recognizes the speech instruction for watching the movie ABC to obtain an event type, an actor name, and a movie name, finds a playing address of the movie ABC based on the actor name and the movie name, and then sends the event type to a decision module 1031 of a service distribution system 103. The event type is "watch a movie", the actor name is "Li Si", the movie name is "ABC", and the playing address is "www.dy.ABC.com".

If the device-side smart engine 102 cannot recognize the speech instruction for watching the movie ABC, the device-side smart engine 102 sends the speech instruction for watching the movie ABC in which the actor Li Si stars to a service abstraction system 601 of the cloud server 600 through a cloud smart engine interface 107. The service abstraction system 601 recognizes the speech instruction for watching the movie ABC in which the actor Li Si stars to obtain an event type, an actor name, and a movie name, and finds a playing address based on the actor name and the movie name. The service abstraction system 601 sends the recognized event type to the decision module 1031 of the service distribution system 103 through the cloud smart engine interface 107.

After the decision module 1031 of the service distribution system 103 receives the event type sent by the device-side smart engine 102 or the cloud smart engine interface 107, the decision module 1031 sends a device information obtaining instruction to a device information management module 1032, where device information is device information of each smart device in the ad hoc network 500. After the device information management module 1032 receives the device information obtaining instruction, the device information management module 1032 sends the device information obtaining instruction to a device module 1046 of a device management system 104. After the device module 1046 receives the device information obtaining instruction, the device module 1046 collects a device identifier and an output capability of each smart device in the ad hoc network 500 by using a capability module 1043, the device module 1046 collects the device identifier and a current operating status of each smart device in the ad hoc network 500 by using a status module 1044, the device module 1046 collects the device identifier of each smart device in the ad hoc network 500 and a distance between each smart device and the user by using a sensing module 1045, and the device module 1046 constructs a device information table based on the collected device identifier, output capability, current operating status, and distance of each smart device in the ad hoc network 500, and sends the device information table to the device information management module 1032. After the device information management module 1032 receives the device information table sent by the device module 1046, the device information management module 1032 sends the device information table to the decision module 1031. For a specific structure of the device information table, refer to Table 2.

In the embodiment shown in FIG. 7 to FIG. 9, the decision module 1031 further sends the event type ("watch a movie") to a rule storage module 1041. The rule storage module 1041 finds, from a prestored rule table, a rule corresponding to the event type ("watch a movie"), and sends the rule corresponding to the event type ("watch a movie") to the decision module 1031. For the rule table prestored by the rule storage module 1041, refer to Table 3.

With reference to Table 3, after the rule storage module 1041 receives the event type ("watch a movie") sent by the decision module 1031, the rule storage module 1041 searches Table 3 for the rule corresponding to the event type "watch a movie". The rule corresponding to "watch a movie" is the rule C in Table 3, and the rule storage module 1041 sends the rule C to the decision module 1031.

After the decision module 1031 obtains the device information table shown in Table 2 and the rule C in Table 3, the decision module 1031 may determine a device identifier, in Table 2, that meets a requirement of the rule C. After the determining, the decision module 1031 determines that a device identifier "TV" meets the requirement of the rule C. Therefore, the smart television 200 corresponding to the device identifier "TV" may be used as a secondary device. After the decision module 1031 determines that the smart television 200 in the ad hoc network 500 may be used as the secondary device, the decision module 1031 sends the device identifier ("TV") of the secondary device to the device-side smart engine 102.

With reference to Table 4, after receiving the device identifier ("TV") of the secondary device sent by the decision module 1031, the device-side smart engine 102 looks up Table 4 and learns that a data type corresponding to the device identifier "TV" is "text data, audio data, and image data". The device-side smart engine 102 may learn that a data type corresponding to the playing address ("www.dy.ABC.com") is text data. Therefore, the device-side smart engine 102 may learn from Table 4 that the smart television 200 corresponding to the device identifier "TV" supports text data. The device-side smart engine 102 sends the device identifier ("TV") and the playing address ("www.dy.ABC.com") corresponding to the device identifier to the decision module 1031. The decision module 1031 sends the device identifier ("TV"), the event type ("watch a movie"), and the playing address ("www.dy.ABC.com") corresponding to the device identifier to an encryption and decryption module 1051 of a trust ring module 105 by using an interaction module 1042.

The encryption and decryption module 1051 encrypts the event type ("watch a movie") and the playing address ("www.dy.ABC.com") by using a preset encryption algorithm. For example, the encryption algorithm may be a sha265 encryption algorithm. Certainly, another encryption algorithm may alternatively be used. Then, the encryption and decryption module 1051 sends an encrypted event type ("watch a movie") and an encrypted playing address ("www.dy.ABC.com") to the smart television 200 by using the ad hoc network 500 pre-established by a networking module 106. An encryption and decryption module of a trust ring module 203 of the smart television 200 receives, by using the ad hoc network 500 pre-established by a networking module 204, the encrypted event type ("watch a movie") and the encrypted playing address ("www.dy.ABC.com") that are sent by the encryption and decryption module 1051 of the smartphone 100. The encryption and decryption module of the trust ring module 203 decrypts the encrypted event type ("watch a movie") and the encrypted playing address ("www.dy.ABC.com") by using a preset decryption algorithm, to obtain the event type ("watch a movie") and the playing address ("www.dy.ABC.com"). The encryption and decryption module of the trust ring module 203 sends the event type ("watch a movie") and the playing address ("www.dy.ABC.com") to a smart presentation system 201 by using a device management system 202. The smart presentation system 201 determines, based on the event type, a manner of presenting incoming call information. For example, assuming that the smart presentation system 201 determines that the event type is "watch a movie", the smart presentation system 201 parses the playing address ("www.dy.ABC.com") to cache video data of the movie ABC; and then the smart presentation system 201 displays the movie ABC through the screen of the smart television 200.

In the embodiment shown in FIG. 7 to FIG. 9, a condition that the smartphone 100 starts to find a secondary device may be preset. For example, the condition that the smartphone 100 starts to find a secondary device may be set as follows: When the smartphone 100 receives the speech instruction for watching the movie, the smartphone 100 starts to find a secondary device. For another example, the condition that the smartphone 100 starts to find a secondary device may be set as follows: When the smartphone 100 receives the speech instruction for watching the movie, the smartphone 100 asks the user whether to play the movie by using a suitable secondary device; and if the user agrees, the smartphone 100 starts to find a secondary device.

In the embodiment shown in FIG. 7 to FIG. 9, the smartphone 100 is an autonomous primary device. When the device-side smart engine 102 of the smartphone 100 cannot recognize the speech instruction input by the user, the smartphone 100 recognizes the speech instruction by using the cloud server 600. Then, the smartphone 100 selects, in the ad hoc network 500 depending on a computing capability of the smartphone 100, the smart television 200 suitable for playing the movie, and plays the movie by using the smart television 200. It can be learned from the embodiment shown in FIG. 7 to FIG. 9 that, according to the device cooperation method provided in the embodiments of this application, a smart device can actively cooperate with another smart device to jointly complete a to-be-processed event, so that an actual requirement of the user is met better.

Figure 10:
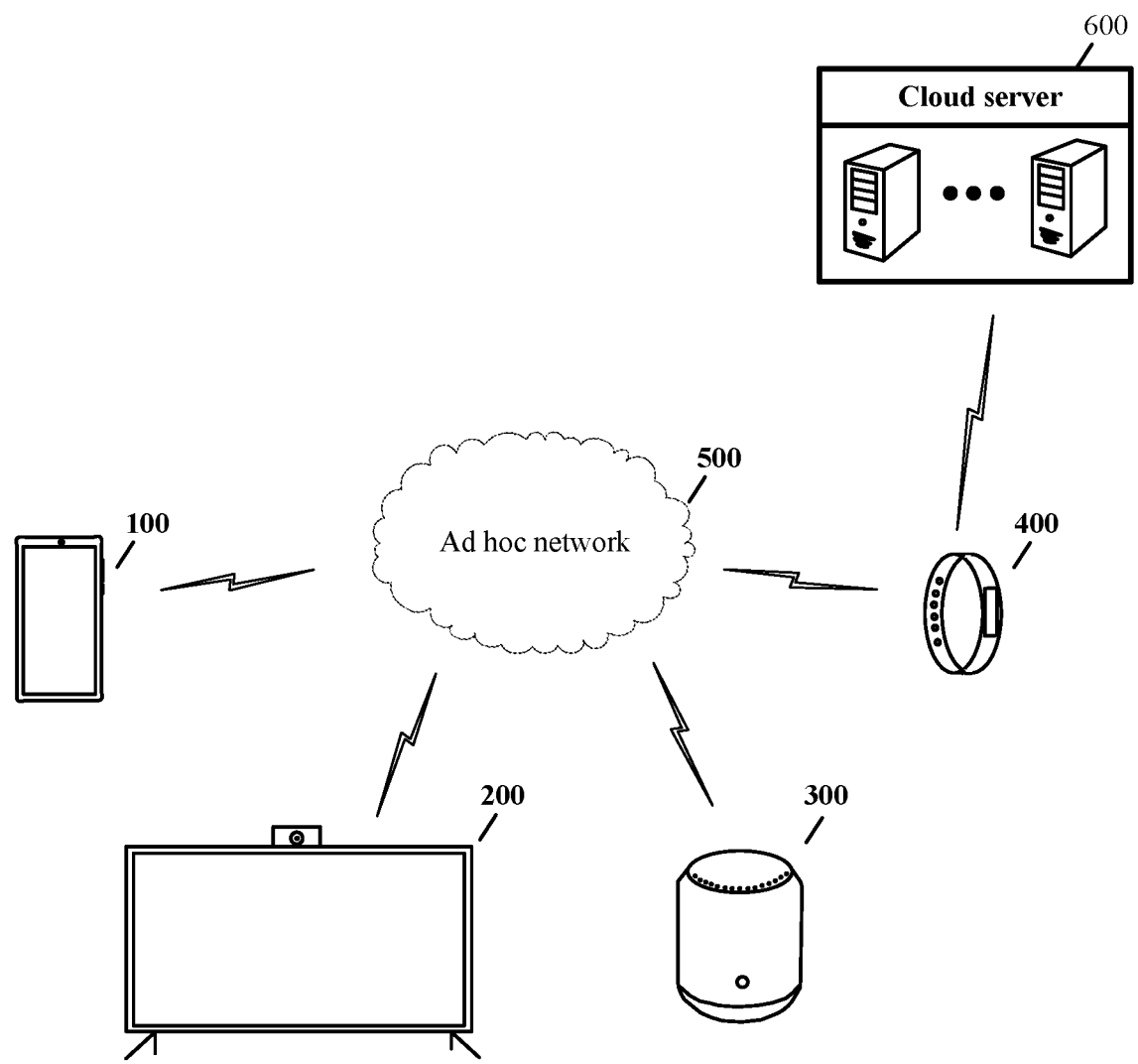
FIG. 10 is a schematic diagram of still another application scenario according to an embodiment of this application.
Figure 11:
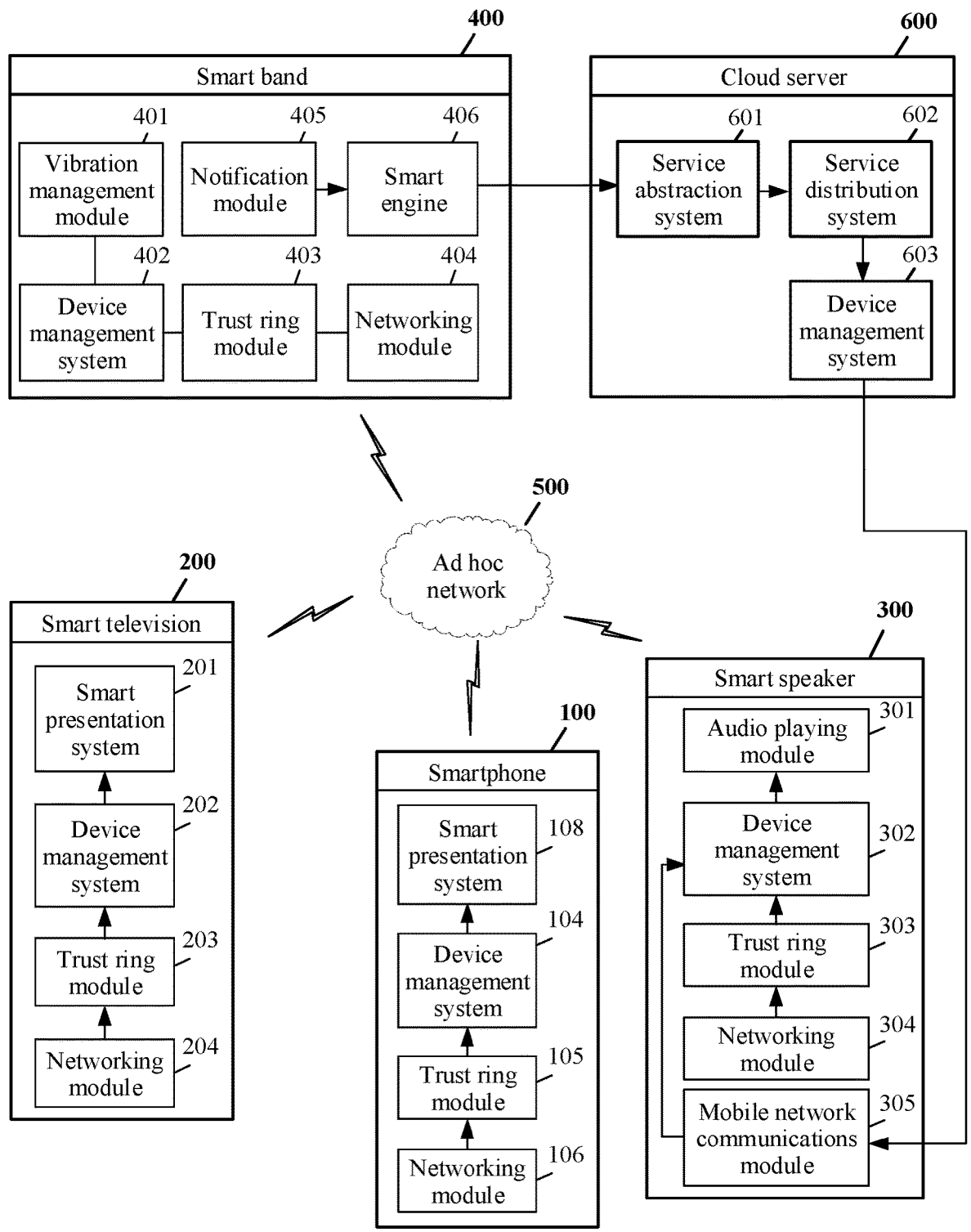
FIG. 11 is a diagram of internal structures of each smart device and a cloud server 600 in FIG. 10.
Figure 12:
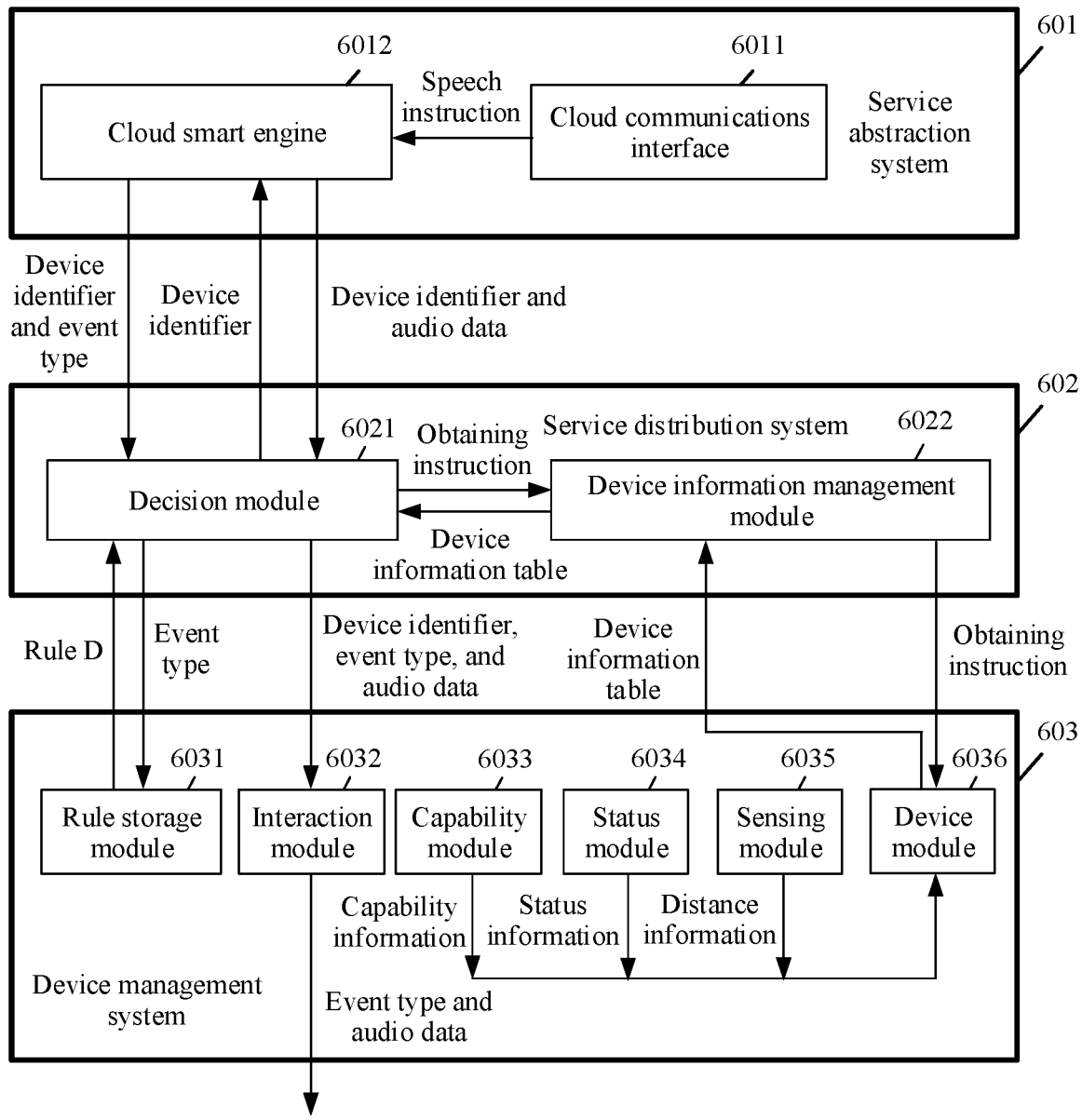
FIG. 12 is a detailed structural diagram of the cloud server 600 in FIG. 10.

FIG. 10 is a schematic diagram of still another application scenario according to an embodiment of this application. FIG. 11 is a diagram of internal structures of each smart device and a cloud server 600 in FIG. 10. FIG. 12 is a detailed structural diagram of a cloud server 600 in FIG. 10. The application scenario shown in FIG. 10 is the scenario 3 in Table 1. The application scenario shown in FIG. 10 includes a cloud server 600 and four smart devices. The four smart devices are a smartphone 100, a smart television 200, a smart speaker 300, and a smart band 400. The four smart devices shown in FIG. 10 may communicate with each other by using a pre-established ad hoc network 500. In FIG. 10, the cloud server 600 is added based on the application scenario shown in FIG. 4. The smart band 400 may communicate with the cloud server 600 by using a mobile network, and the smart television 200, the smart speaker 300, and the smartphone 100 may also communicate with the cloud server 600 by using the internet or a mobile network.

In the embodiment shown in FIG. 10 to FIG. 12, it is assumed that a user has the smartphone 100, the smart television 200, the smart speaker 300, and the smart band 400; the smartphone 100, the smart television 200, the smart speaker 300, the smart band 400, and the user are all located in a living room; and the user wears the smart band 400. When the user inputs a speech instruction for playing the music DEF to the smart band 400, a notification module 405 of the smart band 400 sends the speech instruction for playing the music DEF to a smart engine 406. The smart engine 406 sends the speech instruction for playing the music DEF and a device identifier "Band" of the smart band 400 to a cloud communications interface 6011 of a service abstraction system 601 of the cloud server 600. The cloud communications interface 6011 sends the speech instruction for playing the music DEF and the device identifier "Band" to a cloud smart engine 6012. The cloud smart engine 6012 recognizes the speech instruction for playing the music DEF to obtain an event type and a music name. The cloud smart engine 6012 sends the device identifier "Band" and the recognized event type to a decision module 6021 of a service distribution system 602, where the recognized event type is "listen to music", and the music name is "DEF".

After the decision module 6021 of the service distribution system 602 receives the device identifier "Band" and the event type "listen to music" that are sent by the cloud smart engine 6012, the decision module 6021 sends, to a device information management module 6022, a device information table obtaining instruction corresponding to the device identifier "Band" in the ad hoc network. After the device information management module 6022 receives the device information table obtaining instruction corresponding to the device identifier "Band" in the ad hoc network, the device information management module 6032 sends the device information table obtaining instruction corresponding to the device identifier "Band" in the ad hoc network to a device module 6036. After the device module 6036 receives the device information table obtaining instruction corresponding to the device identifier "Band" in the ad hoc network, the device module 6036 first finds that an ad hoc network identifier corresponding to "Band" is "Network-A". Then, the device module 6036 collects, by using a capability module 6033, a device identifier and an output capability corresponding to the ad hoc network identifier "Network-A", the device module 6036 collects, by using a status module 6034, the device identifier and a current operating status corresponding to the ad hoc network identifier "Network-A", the device module 6036 collects, by using a sensing module 6035, the device identifier corresponding to the ad hoc network identifier "Network-A" and a distance between each smart device and the user, and the device module 6036 constructs a device information table based on the collected device identifier, output capability, current operating status, and distance corresponding to the ad hoc network identifier "Network-A", and sends the device information table to the device information management module 6022. After the device information management module 6022 receives the device information table sent by the device module 6036, the device information management module 6022 sends the device information table to the decision module 6021. For a specific structure of the device information table, refer to Table 5.

Table 5 shows a device information table in which an ad hoc network identifier is "Network-A". It is assumed that "Network-A" is the ad hoc network identifier of the ad hoc network 500. The device information table includes the ad hoc network identifier, a device identifier, a current operating status, a distance, and an output capability.

TABLE 5

| Ad hoc network identifier | Device identifier | Current operating status | Distance | Output capability |
|---|---|---|---|---|
| Network-A | TV | Power-on state | 2 meters | Display an image and output a sound |
| Network-A | Speaker | Power-on state | 3 meters | Output a sound |
| Network-A | Band | Power-on state | 0 | Vibrate |
| Network-A | Phone | Power-on state | 1 meter | Display an image, output a sound, and vibrate |
| ... | ... | ... | ... | ... |

With reference to Table 5, in the embodiment shown in FIG. 10 to FIG. 12, a device management system 104 of the smartphone 100 may send the ad hoc network identifier, the device identifier, and the output capability to the capability module 6033 of a device management system 603 of the cloud server 600 by using a mobile network. The device management system 104 of the smartphone 100 may send the ad hoc network identifier, the device identifier, and the current operating status to the status module 6034 of the device management system 603 of the cloud server 600 by using a mobile network. The device management system 104 of the smartphone 100 may send the ad hoc network identifier, the device identifier, and the distance between the smartphone 100 and the user to the sensing module 6035 of the device management system 603 of the cloud server 600 by using a mobile network. Similarly, a device management system 202 of the smart television 200, a device management system 302 of the smart speaker 300, and a device management system 402 of the smart band 400 also separately send respective current operating statuses, distances, and output capabilities to the capability module 6033, the status module 6034, and the sensing module 6035 of the device management system 603 of the cloud server 600. Therefore, the capability module 6033, the status module 6034, and the sensing module 6035 of the device management system 603 of the cloud server 600 learn of device information of each smart device in the ad hoc network 500, and the device module 6036 can construct, based on information from the capability module 6033, the status module 6034, and the sensing module 6035, the device information table in which the ad hoc network identifier is "Network-A".

In the embodiment shown in FIG. 10 to FIG. 12, the decision module 6021 further sends the event type ("listen to music") to a rule storage module 6031. The rule storage module 6031 finds, from a prestored rule table, a rule corresponding to the event type ("listen to music"), and sends the rule corresponding to the event type ("listen to music") to the decision module 6021. For the rule table prestored by the rule storage module 6031, refer to Table 3.

With reference to Table 3, after the rule storage module 6031 receives the event type ("listen to music") sent by the decision module 6021, the rule storage module 6031 searches Table 3 for the rule corresponding to the event type "listen to music". The rule corresponding to "listen to music" is the rule D in Table 3, and the rule storage module 6031 sends the rule D to the decision module 6021.

After the decision module 6021 obtains the device information table shown in Table 5 and the rule D in Table 3, the decision module 6021 may determine a device identifier, in Table 5, that meets a requirement of the rule D. After the determining, the decision module 6021 determines that a device identifier "Speaker" meets the requirement of the rule D. Therefore, the smart television 200 corresponding to the device identifier "Speaker" may be used as a secondary device. After the decision module 6021 determines that the smart speaker 300 in the ad hoc network 500 may be used as the secondary device, the decision module 6021 sends the device identifier ("Speaker") of the secondary device to the cloud smart engine 6012.

With reference to Table 4, after the cloud smart engine 6012 receives the device identifier ("Speaker") of the secondary device sent by the decision module 6021, the cloud smart engine 6012 looks up Table 4 and learns that a data type corresponding to the device identifier "Speaker" is "audio data". The cloud smart engine 6012 may learn that a data type corresponding to the music name ("DEF") is text data. Therefore, the cloud smart engine 6012 may learn from Table 4 that the smart speaker 300 corresponding to the device identifier "Speaker" does not support text data. The cloud smart engine 6012 obtains audio data corresponding to the music name ("DEF"), and sends the device identifier ("Speaker") and the audio data corresponding to the device identifier to the decision module 6021. The decision module 6021 sends the device identifier ("Speaker"), the event type (listen to music), and the audio data corresponding to the device identifier to an interaction module 6032. The interaction module 6032 sends the event type (listen to music) and the audio data corresponding to the music name "DEF" to a mobile network communications module 305 of the smart speaker 300. After the mobile network communications module 305 of the smart speaker 300 receives the audio data that is sent by the interaction module 6032 and that corresponds to the music name "DEF", the mobile network communications module 305 sends the event type (listen to music) and the audio data corresponding to the music name "DEF" to an audio playing module 301 by using the device management system 302. The audio playing module 301 determines, based on the event type, a manner of outputting the audio data. For example, assuming that the audio playing module 301 determines that the event type is "listen to music", the audio playing module 301 plays, at a volume level of 50%, the audio data corresponding to the music name "DEF" through the speaker.

In the embodiment shown in FIG. 10 to FIG. 12, the smart band 400 is a non-autonomous primary device. When the smart band 400 receives the speech instruction, input by the user, for playing the music, the smart band 400 selects, in the ad hoc network 500 depending on a computing capability of the cloud server 400, the smart speaker 300 suitable for playing the music, and the cloud server 400 controls the smart speaker 300 to play the music. It can be learned from the embodiment shown in FIG. 10 to FIG. 12 that, according to the device cooperation method provided in the embodiments of this application, a smart device can actively cooperate with another smart device to jointly complete a to-be-processed event, so that an actual requirement of the user is met better.

Figure 13:
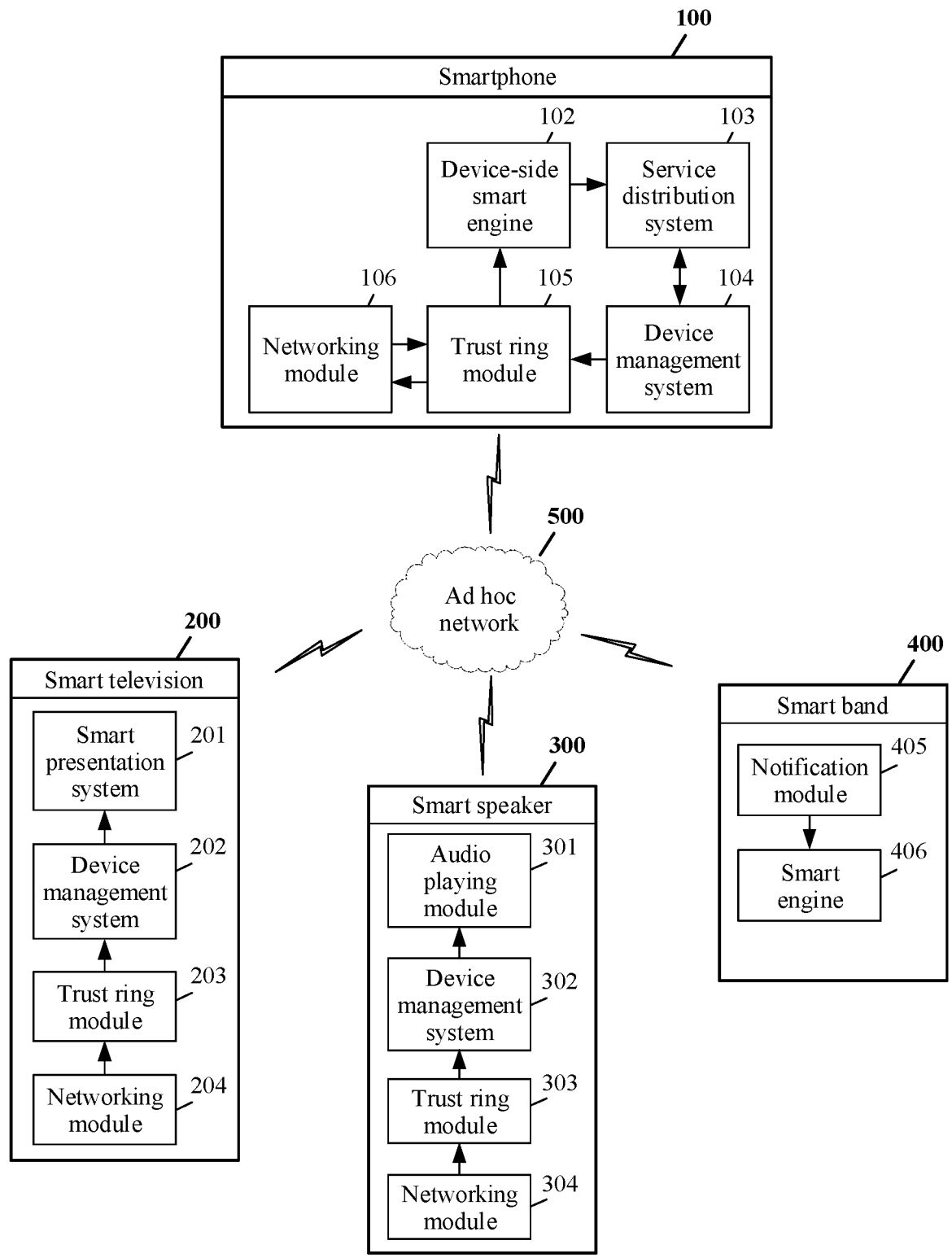
FIG. 13 is a schematic diagram of still another application scenario according to an embodiment of this application.
Figure 14:
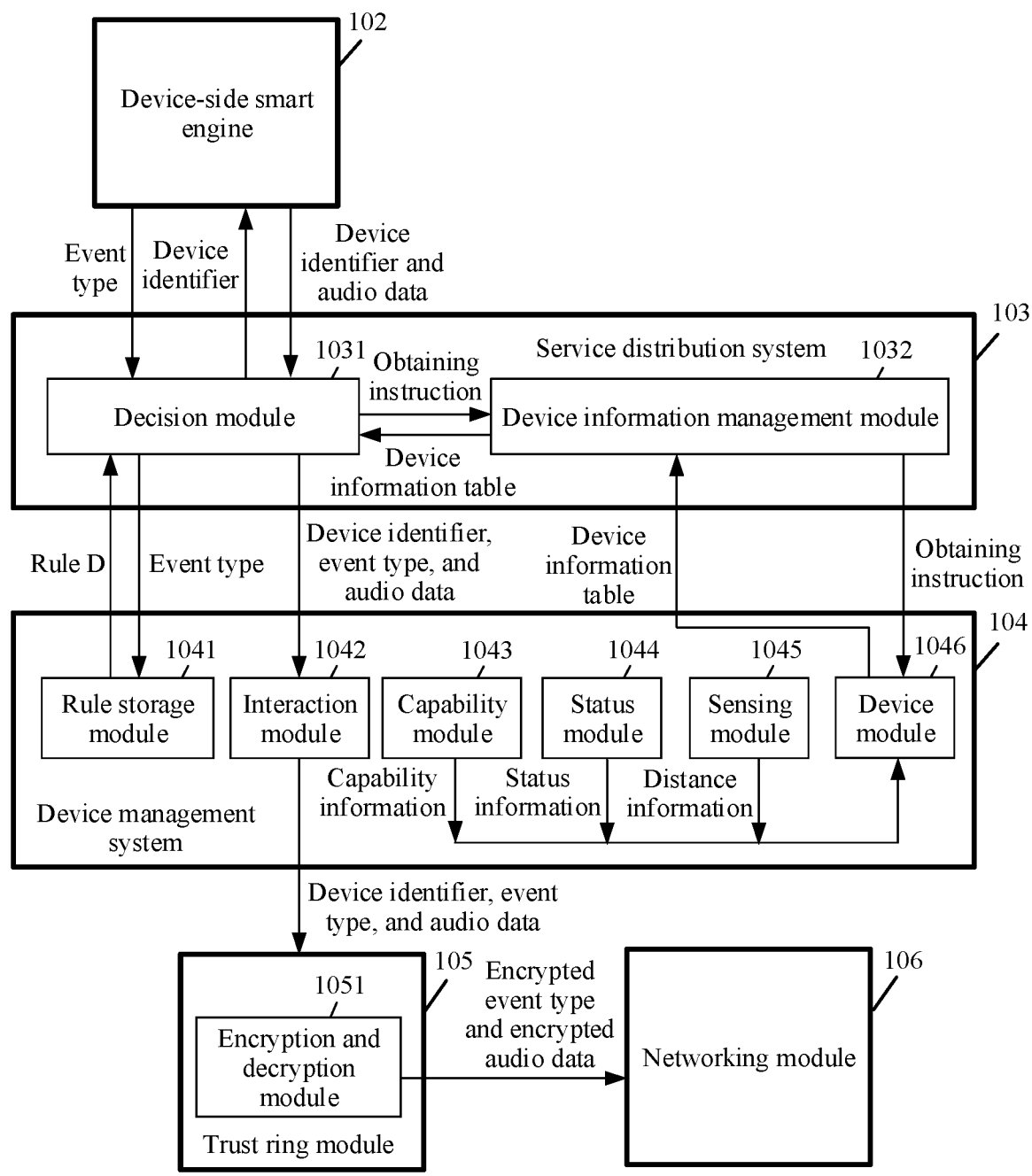
FIG. 14 is a detailed structural diagram of a smartphone 100 in FIG. 13.

FIG. 13 is a schematic diagram of still another application scenario according to an embodiment of this application. FIG. 14 is a detailed structural diagram of a smartphone 100 in FIG. 13. The application scenario shown in FIG. 13 and FIG. 14 is the scenario 4 in Table 1. The application scenario shown in FIG. 13 includes four smart devices. The four smart devices are a smartphone 100, a smart television 200, a smart speaker 300, and a smart band 400. The four smart devices shown in FIG. 13 may communicate with each other by using a pre-established ad hoc network 500.

In the embodiment shown in FIG. 13 and FIG. 14, it is assumed that a user has the smartphone 100, the smart television 200, the smart speaker 300, and the smart band 400; the smartphone 100, the smart television 200, the smart speaker 300, the smart band 400, and the user are all located in a living room; and the user wears the smart band 400. When the user inputs a speech instruction for playing the music DEF to the smart band 400, a notification module 405 of the smart band 400 sends the speech instruction for playing the music DEF to a smart engine 406. The smart engine 406 sends the speech instruction for playing the music DEF to a device-side smart engine 102 of the smartphone 100. The device-side smart engine 102 recognizes the speech instruction for playing the music DEF to obtain an event type and a music name, and sends the event type to a decision module 1031 of a service distribution system 103, where the event type is "listen to music", and the music name is "DEF".

After the decision module 1031 of the service distribution system 103 receives the event type sent by the device-side smart engine 102, the decision module 1031 sends a device information obtaining instruction to a device information management module 1032, where device information is device information of each smart device in the ad hoc network 500. After the device information management module 1032 receives the device information obtaining instruction, the device information management module 1032 sends the device information obtaining instruction to a device module 1046 of a device management system 104. After the device module 1046 receives the device information obtaining instruction, the device module 1046 collects a device identifier and an output capability of each smart device in the ad hoc network 500 by using a capability module 1043, the device module 1046 collects the device identifier and a current operating status of each smart device in the ad hoc network 500 by using a status module 1044, the device module 1046 collects the device identifier of each smart device in the ad hoc network 500 and a distance between each smart device and the user by using a sensing module 1045, and the device module 1046 constructs a device information table based on the collected device identifier, output capability, current operating status, and distance of each smart device in the ad hoc network 500, and sends the device information table to the device information management module 1032. After the device information management module 1032 receives the device information table sent by the device module 1046, the device information management module 1032 sends the device information table to the decision module 1031. For a specific structure of the device information table, refer to Table 2.

In the embodiment shown in FIG. 13 and FIG. 14, the decision module 1031 further sends the event type ("listen to music") to a rule storage module 1041. The rule storage module 1041 finds, from a prestored rule table, a rule corresponding to the event type ("listen to music"), and sends the rule corresponding to the event type ("listen to music") to the decision module 1031.

With reference to Table 3, after the rule storage module 1041 receives the event type ("listen to music") sent by the decision module 1031, the rule storage module 1041 searches Table 3 for the rule corresponding to the event type "listen to music". The rule corresponding to "listen to music" is the rule D in Table 3, and the rule storage module 1041 sends the rule D to the decision module 1031.

After the decision module 1031 obtains the device information table shown in Table 2 and the rule D in Table 3, the decision module 1031 may determine a device identifier, in Table 2, that meets a requirement of the rule D. After the determining, the decision module 1031 determines that a device identifier "Speaker" meets the requirement of the rule D. Therefore, the smart speaker 300 corresponding to the device identifier "Speaker" may be used as a secondary device. After the decision module 1031 determines that the smart speaker 300 in the ad hoc network 500 may be used as the secondary device, the decision module 1031 sends the device identifier ("Speaker") of the secondary device to the device-side smart engine 102.

With reference to Table 4, after the device-side smart engine 102 receives the device identifier ("Speaker") of the secondary device sent by the decision module 1031, the device-side smart engine 102 looks up Table 4 and learns that a data type corresponding to the device identifier "Speaker" is "audio data". The device-side smart engine 102 may learn that a data type corresponding to the music name ("DEF") is text data. Therefore, the device-side smart engine 102 may learn from Table 4 that the smart speaker 300 corresponding to the device identifier "Speaker" does not support text data. The device-side smart engine 102 obtains audio data corresponding to the music name ("DEF"), and sends the device identifier ("Speaker") and the audio data corresponding to the device identifier to the decision module 1031. The decision module 1031 sends the device identifier ("Speaker"), the event type (listen to music), and the audio data corresponding to the device identifier to an interaction module 1042. The interaction module 1042 sends the event type (listen to music) and the audio data corresponding to the device identifier to an encryption and decryption module 1051 of a trust ring module 105.

The encryption and decryption module 1051 encrypts, by using a preset encryption algorithm, the event type (listen to music) and the audio data corresponding to the music name "DEF". Then, the encryption and decryption module 1051 sends an encrypted event type (listen to music) and encrypted audio data to the smart speaker 300 by using the ad hoc network 500 pre-established by a networking module 106. An encryption and decryption module of a trust ring module 303 of the smart speaker 300 receives, by using the ad hoc network 500 pre-established by a networking module 304, the encrypted event type (listen to music) and the encrypted audio data that are sent by the encryption and decryption module 1051 of the smartphone 100. The encryption and decryption module of the trust ring module 303 decrypts the encrypted event type (listen to music) and the encrypted audio data by using a preset decryption algorithm, to obtain the event type (listen to music) and the audio data. The encryption and decryption module of the trust ring module 303 sends the event type (listen to music) and the audio data to an audio playing module 301 by using a device management system 302. The audio playing module 301 determines, based on the event type, a manner of outputting the audio data. For example, assuming that the audio playing module 301 determines that the event type is "listen to music", the audio playing module 301 plays, at a volume level of 50%, the audio data corresponding to the music name "DEF" through the speaker.

In the embodiment shown in FIG. 13 and FIG. 14, the smart band 400 is a non-autonomous primary device. When the smart band 400 receives the speech instruction, input by the user, for playing the music, the smart band 400 selects, in the ad hoc network 500 depending on a computing capability of the smartphone 100 in the ad hoc network 500, the smart speaker 300 suitable for playing the music, and the smartphone 100 controls the smart speaker 300 to play the music. It can be learned from the embodiment shown in FIG. 13 and FIG. 14 that, according to the device cooperation method provided in the embodiments of this application, a smart device can actively cooperate with another smart device to jointly complete a to-be-processed event, so that an actual requirement of the user is met better.

Figure 15:
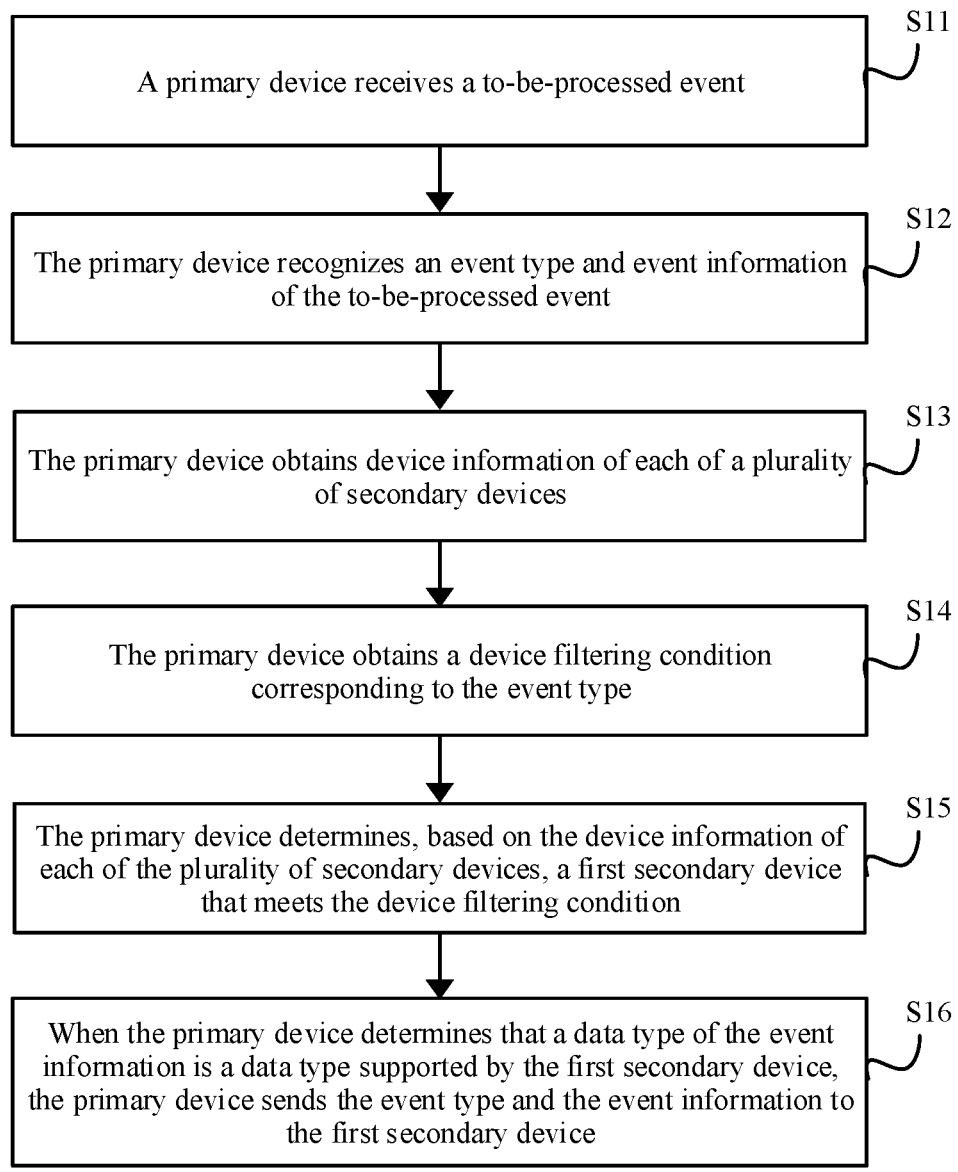
FIG. 15 is a flowchart of a device cooperation method according to an embodiment of this application.

FIG. 15 is a flowchart of a device cooperation method according to an embodiment of this application. The embodiment shown in FIG. 15 and the embodiment shown in FIG. 4 to FIG. 6 are both used to describe the scenario 1 in Table 1. The embodiment shown in FIG. 4 to FIG. 6 is used to describe the application scenario and the actual example of the scenario 1 in Table 1, and the embodiment shown in FIG. 15 is used to describe an execution procedure and a working principle of the scenario 1 in Table 1. For an application scenario corresponding to FIG. 15, refer to the embodiment shown in FIG. 4 to FIG. 6.

In the embodiment shown in FIG. 15, the device cooperation method shown in FIG. 15 may be applied to a primary device. The primary device pre-establishes communication connections to a plurality of secondary devices, and the plurality of secondary devices may be two or more secondary devices. According to the device cooperation method shown in FIG. 15, the primary device can actively cooperate with another secondary device to jointly complete a to-be-processed event. The primary device is a rich device.

For an internal structure of the primary device, refer to the framework diagram of the rich device shown in FIG. 1. The method shown in FIG. 15 includes the following steps.

Step S11: The primary device receives a to-be-processed event.

The primary device may be a device having a relatively high computing capability such as a smartphone, a tablet computer, or a smart television. There are a plurality of types of to-be-processed events. The to-be-processed event may be a notification-type event, a speech instruction, a screen touch instruction, or the like. The notification-type event may be an incoming call event, an information event, an alarm clock event, or the like.

The following describes several application scenarios of this embodiment of this application.

For example, the primary device is a smartphone, and the to-be-processed event is an incoming call on the smartphone. For another example, the primary device is a smartphone, and the to-be-processed event is information received by application software on the smartphone. For another example, the main device is a smartphone, and an alarm clock event is an alarm clock set on the smartphone. For still another example, the primary device is a smartphone, and a speech instruction is a speech instruction input by a user to the smartphone. For yet another example, the primary device is a smartphone, and a screen touch instruction is a control gesture or a tap operation input by the user on a touchscreen of the smartphone.

Step S12: The primary device recognizes an event type and event information of the to-be-processed event.

After the primary device receives the to-be-processed event, the primary device starts to recognize the to-be-processed event, and obtains the event type and the event information.

For example, assuming that the to-be-processed event is the incoming call event, the primary device may recognize the incoming call event and obtain the event type "incoming call" and the event information including a caller name and a call number, where the caller name is "Zhang San", and the call number is "12345".

Step S13: The primary device obtains device information of each of the plurality of secondary devices.

The device information of the secondary device includes an operating status of the secondary device, an output capability of the secondary device, and a distance between the secondary device and the user.

For example, with reference to Table 2, Table 2 shows device information of three secondary devices.

In step S13, the primary device may send a device information obtaining instruction to each of the plurality of secondary devices. After the plurality of secondary devices receive the device information obtaining instruction sent by the primary device, the plurality of secondary devices send respective device information to the primary device. Then, the primary device may receive the device information sent by the plurality of secondary devices.

Step S14: The primary device obtains a device filtering condition corresponding to the event type.

The device filtering condition is used to indicate device information of a secondary device matching the event type.

In step S14, the primary device pre-establishes a correspondence between an event type and a device filtering condition. For example, with reference to Table 3, Table 3 shows a table of a correspondence that is between an event type and a device filtering condition and that is pre-established by the primary device.

After the primary device obtains the event type, the primary device may search Table 3 for the device filtering condition corresponding to the obtained event type.

For example, as shown in Table 3, both "incoming call" and "received information" belong to notification-type events, and a rule shown in Table 3 is equivalent to the device filtering condition described in the embodiment shown in FIG. 15. A device filtering condition corresponding to the notification-type event may include: A secondary device is in a power-on state, a distance between the secondary device and the user is less than a threshold, and the secondary device has an output capability of displaying an image, outputting a sound, or vibration.

For another example, as shown in Table 3, "watch a movie" belongs to a video playing event, and a device filtering condition corresponding to the video playing event may include: A secondary device is in a power-on state, a distance between the secondary device and the user is less than a threshold, and the secondary device has an output capability of displaying an image and outputting a sound.

For still another example, as shown in Table 3, "listen to music" belongs to a music playing event, and a device filtering condition corresponding to the music playing event may include: A secondary device is in a power-on state, a distance between the secondary device and the user is less than a threshold, and the secondary device has an output capability of outputting a sound.

Step S15: The primary device determines, based on the device information of each of the plurality of secondary devices, a first secondary device that meets the device filtering condition.

After the primary device obtains the device information of each of the plurality of secondary devices and the device filtering condition corresponding to the event type, the primary device may find, based on device information in Table 2, the first secondary device that meets a criterion of the device filtering condition.

The first secondary device may be one secondary device that meets the device filtering condition, or a plurality of secondary devices that meet the device filtering condition. "First" in the first secondary device is used to distinguish, in terms of names, a secondary device from a plurality of secondary devices whose device information does not meet the device filtering condition.

Step S16: When the primary device determines that a data type of the event information is a data type supported by the first secondary device, the primary device sends the event type and the event information to the first secondary device.

The event information has a plurality of data types. The data types of the event information may be text data, audio data, image data, and a control instruction.

For example, assuming that the data type of the event information is text data, and the data type supported by the first secondary device includes text data, the primary device may send the event type and the event information to the first secondary device.

In step S16, the primary device may first encrypt the event type and the event information to obtain encrypted data, and then send the encrypted data to the first secondary device, to ensure data transmission security.

In the embodiment shown in FIG. 15, when the primary device determines that the data type of the event information is a data type not supported by the first secondary device, the primary device converts the event information into a data type supported by the first secondary device to obtain target data, and the primary device sends the event type and the target data to the first secondary device. This ensures that the target data sent by the primary device to the first secondary device has a data type supported by the first secondary device.

For example, assuming that the data type of the event information is text data, the event type is a notification-type event, and the data type supported by the first secondary device is audio data, the primary device cannot directly send the event type and the event information to the first secondary device. The primary device needs to convert the event information into audio data, and then sends the event type and the audio data to the first secondary device.

For another example, assuming that the data type of the event information is text data, the event type is a music playing event, and the data type supported by the first secondary device is audio data, the primary device cannot directly send the event type and the event information to the first secondary device. The primary device needs to convert the event information into audio data, and then sends the event type and the audio data to the first secondary device.

For still another example, assuming that the data type of the event information is text data, the event type is a notification-type event, and the data type supported by the first secondary device is an instruction type, the primary device cannot directly send the event type and the event information to the first secondary device. The primary device needs to convert the event information into an instruction type, and then sends the event type and the instruction type to the first secondary device.

In the embodiment shown in FIG. 15, in the step in which the primary device sends the event type and the target data to the first secondary device, the primary device may first encrypt the event type and the target data to obtain encrypted data, and then the primary device sends the encrypted data to the first secondary device, to ensure data transmission security.

In the embodiment shown in FIG. 15, the primary device obtains the device information of each of the plurality of secondary devices, obtains the device filtering condition corresponding to the event type, then selects, from the plurality of secondary devices based on the obtained device information and the obtained device filtering condition, the first secondary device suitable for displaying the event type of the to-be-processed event, and sends the event information to the first secondary device, so that the first secondary device assists the primary device in presenting the event information. According to the device cooperation method provided in this embodiment of this application, the primary device can actively cooperate with another secondary device to jointly complete the to-be-processed event, so that an actual requirement of the user is met better.

Figure 16:
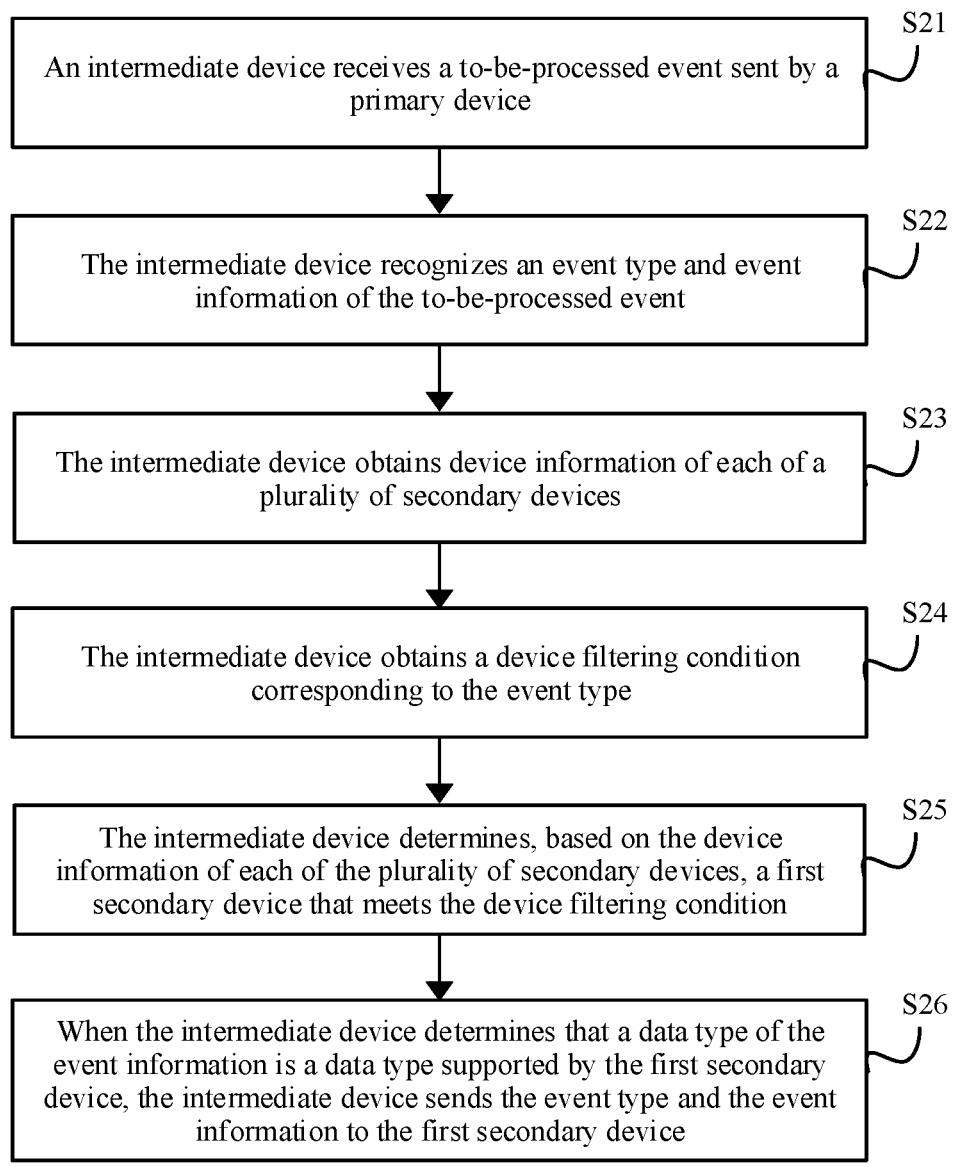
FIG. 16 is a flowchart of another device cooperation method according to an embodiment of this application.

FIG. 16 is a flowchart of another device cooperation method according to an embodiment of this application. The embodiment shown in FIG. 16 and the embodiment shown in FIG. 13 and FIG. 14 are used to describe the scenario 4 in Table 1. The embodiment shown in FIG. 13 and FIG. 14 is used to describe the application scenario and the actual example of the scenario 4 in Table 1, and the embodiment shown in FIG. 16 is used to describe an execution procedure and a working principle of the scenario 4 in Table 1. For an application scenario corresponding to FIG. 16, refer to the embodiment shown in FIG. 13 and FIG. 14.

In the embodiment shown in FIG. 16, the device cooperation method shown in FIG. 16 may be applied to an intermediate device. The intermediate device pre-establishes communication connections to a primary device and a plurality of secondary devices, and the plurality of secondary devices may be two or more secondary devices. According to the device cooperation method shown in FIG. 16, the intermediate device can assist the primary device to actively cooperate with another secondary device to jointly complete a to-be-processed event. The primary device is a lite device, and the intermediate device is a rich device. For an internal structure of the primary device, refer to the framework diagram of the lite device shown in FIG. 2. For an internal structure of the intermediate device, refer to the framework diagram of the rich device shown in FIG. 1. The method shown in FIG. 16 includes the following steps.

Step S21: The intermediate device receives a to-be-processed event sent by the primary device.

The primary device may be a device having a relatively low computing capability such as a smart speaker, a smart band, or a smart watch, and the intermediate device may be a device having a relatively high computing capability such as a smartphone, a tablet computer, or a smart television.

There are a plurality of types of to-be-processed events. The to-be-processed event may be a notification-type event, a speech instruction, a screen touch instruction, or the like. The notification-type event may be an incoming call event, an information event, an alarm clock event, or the like.

Certainly, if the primary device does not have a communications module, the primary device cannot receive an incoming call event. If the primary device does not have a touchscreen, the primary device cannot receive a screen touch instruction. If the primary device does not have a speech input module, the primary device cannot receive a speech instruction.

For example, the primary device is a smart band, the smart band has a speech input module, the intermediate device is a smartphone, and the to-be-processed event may be a speech instruction input by a user to the smart band.

Step S22: The intermediate device recognizes an event type and event information of the to-be-processed event.

After the intermediate device receives the to-be-processed event sent by the primary device, the intermediate device starts to recognize the to-be-processed event, and obtains the event type and the event information.

For example, assuming that the to-be-processed event is a speech instruction "play the music DEF", the intermediate device may recognize an incoming call event and obtain the event type "listen to music" and the event information including a music name, where the music name is "DEF".

Step S23: The intermediate device obtains device information of each of the plurality of secondary devices.

The device information of the secondary device includes an operating status of the secondary device, an output capability of the secondary device, and a distance between the secondary device and the user.

For example, with reference to Table 2, Table 2 shows device information of three secondary devices.

In step S23, the intermediate device may send a device information obtaining instruction to each of the plurality of secondary devices. After the plurality of secondary devices receive the device information obtaining instruction sent by the intermediate device, the plurality of secondary devices send respective device information to the intermediate device. Then, the intermediate device may receive the device information sent by the plurality of secondary devices.

Step S24: The intermediate device obtains a device filtering condition corresponding to the event type.

The device filtering condition is used to indicate device information of a secondary device matching the event type.

In step S24, the intermediate device pre-establishes a correspondence between an event type and a device filtering condition. For example, with reference to Table 3, Table 3 shows a table of a correspondence that is between an event type and a device filtering condition and that is pre-established by the intermediate device.

After the intermediate device obtains the event type, the intermediate device may search Table 3 for the device filtering condition corresponding to the obtained event type.

For example, as shown in Table 3, both "incoming call" and "received information" belong to notification-type events, and a rule shown in Table 3 is equivalent to the device filtering condition described in the embodiment shown in FIG. 16. A device filtering condition corresponding to the notification-type event may include: A secondary device is in a power-on state, a distance between the secondary device and the user is less than a threshold, and the secondary device has an output capability of displaying an image, outputting a sound, or vibration.

For another example, as shown in Table 3, "watch a movie" belongs to a video playing event, and a device filtering condition corresponding to the video playing event may include: A secondary device is in a power-on state, a distance between the secondary device and the user is less than a threshold, and the secondary device has an output capability of displaying an image and outputting a sound.

For still another example, as shown in Table 3, "listen to music" belongs to a music playing event, and a device filtering condition corresponding to the music playing event may include: A secondary device is in a power-on state, a distance between the secondary device and the user is less than a threshold, and the secondary device has an output capability of outputting a sound.

Step S25: The intermediate device determines, based on the device information of each of the plurality of secondary devices, a first secondary device that meets the device filtering condition.

After the intermediate device obtains the device information of each of the plurality of secondary devices and the device filtering condition corresponding to the event type, the intermediate device may find, based on device information in Table 2, the first secondary device that meets a criterion of the device filtering condition.

The first secondary device may be one secondary device that meets the device filtering condition, or a plurality of secondary devices that meet the device filtering condition. "First" in the first secondary device is used to distinguish, in terms of names, a secondary device from a plurality of secondary devices whose device information does not meet the device filtering condition.

Step S26: When the intermediate device determines that a data type of the event information is a data type supported by the first secondary device, the intermediate device sends the event type and the event information to the first secondary device.

The event information has a plurality of data types. The data types of the event information may be text data, audio data, image data, and a control instruction.

For example, assuming that the data type of the event information is text data, and the data type supported by the first secondary device includes text data, the intermediate device may send the event type and the event information to the first secondary device.

In step S26, the intermediate device may first encrypt the event type and the event information to obtain encrypted data, and then send the encrypted data to the first secondary device, to ensure data transmission security.

In the embodiment shown in FIG. 16, when the intermediate device determines that the data type of the event information is a data type not supported by the first secondary device, the intermediate device converts the event information into a data type supported by the first secondary device to obtain target data, and the intermediate device sends the event type and the target data to the first secondary device. This ensures that the target data sent by the intermediate device to the first secondary device has a data type supported by the first secondary device.

For example, assuming that the data type of the event information is text data, the event type is a notification-type event, and the data type supported by the first secondary device is audio data, the intermediate device cannot directly send the event type and the event information to the first secondary device. The intermediate device needs to convert the event information into audio data, and then sends the event type and the audio data to the first secondary device.

For another example, assuming that the data type of the event information is text data, the event type is a music playing event, and the data type supported by the first secondary device is audio data, the intermediate device cannot directly send the event type and the event information to the first secondary device. The intermediate device needs to convert the event information into audio data, and then sends the event type and the audio data to the first secondary device.

For still another example, assuming that the data type of the event information is text data, the event type is a notification-type event, and the data type supported by the first secondary device is an instruction type, the intermediate device cannot directly send the event type and the event information to the first secondary device. The intermediate device needs to convert the event information into an instruction type, and then sends the event type and the instruction type to the first secondary device.

In the embodiment shown in FIG. 16, in the step in which the intermediate device sends the event type and the target data to the first secondary device, the intermediate device may first encrypt the event type and the target data to obtain encrypted data, and then the intermediate device sends the encrypted data to the first secondary device, to ensure data transmission security.

In the embodiment shown in FIG. 16, the intermediate device receives the to-be-processed event sent by the primary device, obtains the device information of each of the plurality of secondary devices, obtains the device filtering condition corresponding to the event type, then selects, from the plurality of secondary devices based on the obtained device information and the obtained device filtering condition, the first secondary device suitable for presenting the event type of the to-be-processed event, and sends the event information to the first secondary device, so that the first secondary device assists the primary device in presenting the event information. According to the device cooperation method provided in this embodiment of this application, the intermediate device can assist the primary device to actively cooperate with another secondary device to jointly complete the to-be-processed event, so that an actual requirement of the user is met better.

Figure 17:
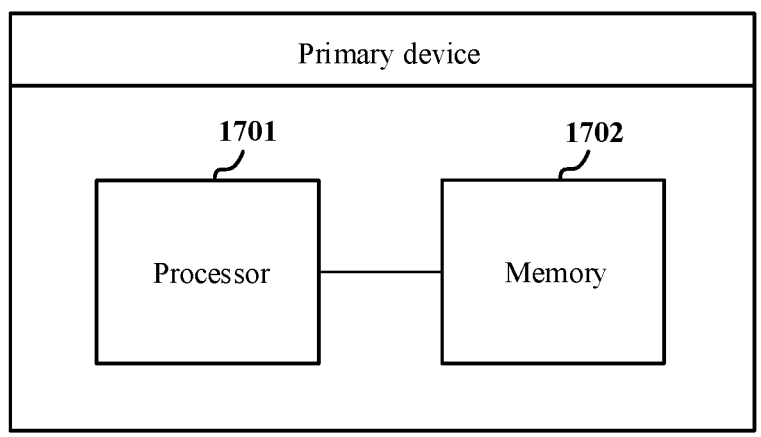
FIG. 17 is a schematic diagram of a primary device according to an embodiment of this application.

FIG. 17 is a schematic diagram of a primary device according to an embodiment of this application. The primary device shown in FIG. 17 pre-establishes communication connections to a plurality of secondary devices. The plurality of secondary devices may be two or more secondary devices. The primary device may actively cooperate with another secondary device to jointly complete a to-be-processed event. The device cooperation method shown in FIG. 15 may be applied to the primary device shown in FIG. 17.

For a function implementation of the primary device shown in FIG. 17, refer to the embodiment shown in FIG. 15.

In the embodiment shown in FIG. 17, the primary device includes a processor 1701 and a memory 1702. The memory 1702 is configured to store instructions. The processor 1701 is configured to execute the instructions stored in the memory 1702. The processor 1701 is configured to: receive a to-be-processed event; recognize an event type and event information of the to-be-processed event; obtain device information of each of the plurality of secondary devices; obtain a device filtering condition corresponding to the event type, where the device filtering condition is used to indicate device information of a secondary device matching the event type; determine, based on the device information of each of the plurality of secondary devices, a first secondary device that meets the device filtering condition; and send the event type and the event information to the first secondary device when determining that a data type of the event information is a data type supported by the first secondary device.

In an embodiment, the processor 1701 is specifically configured to: encrypt the event type and the event information to obtain encrypted data; and send the encrypted data to the first secondary device.

In an embodiment, the processor 1701 is further configured to: when determining that the data type of the event information is a data type not supported by the first secondary device, convert the event information into a data type supported by the first secondary device, to obtain target data; and send the event type and the target data to the first secondary device.

In an embodiment, when the data type supported by the first secondary device is an audio type and the event type is a notification-type event, the target data is audio data; when the data type supported by the first secondary device is an audio type and the event type is a music playing event, the target data is audio data; or when the data type supported by the first secondary device is an instruction type and the event type is a notification-type event, the target data is a control instruction.

In an embodiment, the processor 1701 is specifically configured to: encrypt the event type and the target data to obtain encrypted data; and send the encrypted data to the first secondary device.

In an embodiment, the device information includes an operating status of the secondary device, an output capability of the secondary device, and a distance between the secondary device and a user.

In an embodiment, when the event type is a notification-type event, the device filtering condition includes: the secondary device is in a power-on state, the distance between the secondary device and the user is less than a threshold, and the secondary device has an output capability of displaying an image, outputting a sound, or vibration; when the event type is a video playing event, the device filtering condition includes: the secondary device is in a power-on state, the distance between the secondary device and the user is less than a threshold, and the secondary device has an output capability of displaying an image and outputting a sound; or when the event type is a music playing event, the device filtering condition includes: the secondary device is in a power-on state, the distance between the secondary device and the user is less than a threshold, and the secondary device has an output capability of outputting a sound.

In an embodiment, the to-be-processed event is a notification-type event, a speech instruction, or a screen touch instruction.

In an embodiment, the processor 1701 is specifically configured to: send a device information obtaining instruction to each of the plurality of secondary devices; and receive the device information sent by each of the plurality of secondary devices.

In the embodiment shown in FIG. 17, the processor 1701 may include one or more processing cores. For example, the processor 1701 may be a single-core processor. For another example, the processor 1701 may be an octa-core processor. For still another example, the processor 1701 may be a 12-core processor. Certainly, as technologies develop, a quantity of cores of the processor 1701 may continuously increase, and the quantity of cores of the processor 1701 is not limited to the foregoing quantities.

In the embodiment shown in FIG. 17, the processor 1701 of the primary device obtains the device information of each of the plurality of secondary devices, obtains the device filtering condition corresponding to the event type, then selects, from the plurality of secondary devices based on the obtained device information and the obtained device filtering condition, the first secondary device suitable for presenting the event type of the to-be-processed event, and sends the event information to the first secondary device, so that the first secondary device assists the primary device in presenting the event information. The processor 1701 of the primary device can enable the primary device to actively cooperate with another secondary device to jointly complete the to-be-processed event, so that an actual requirement of the user is met better.

Figure 18:
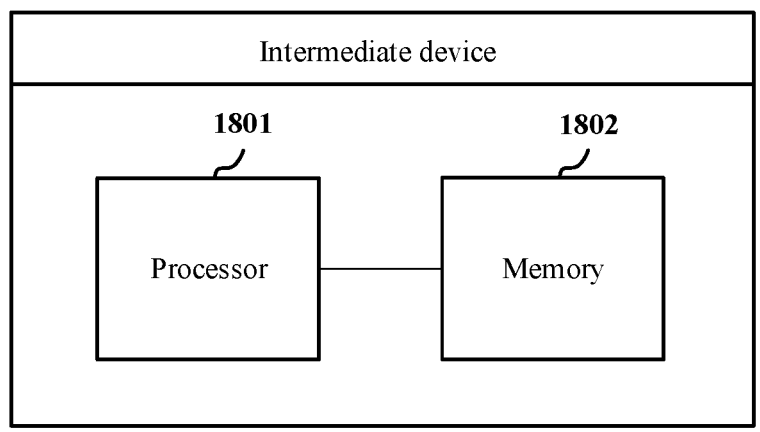
FIG. 18 is a schematic diagram of an intermediate device according to an embodiment of this application.

FIG. 18 is a schematic diagram of an intermediate device according to an embodiment of this application. The intermediate device shown in FIG. 18 pre-establishes communication connections to a primary device and a plurality of secondary devices. The plurality of secondary devices may be two or more secondary devices. The intermediate device may assist the primary device to actively cooperate with another secondary device to jointly complete a to-be-processed event. The device cooperation method shown in FIG. 16 may be applied to the intermediate device shown in FIG. 18. For a function implementation of the intermediate device shown in FIG. 18, refer to the embodiment shown in FIG. 16.

In the embodiment shown in FIG. 18, the primary device includes a processor 1801 and a memory 1802. The memory 1802 is configured to store instructions. The processor 1801 is configured to execute the instructions stored in the memory 1802. The processor 1801 is configured to: receive a to-be-processed event sent by the primary device; recognize an event type and event information of the to-be-processed event; obtain device information of each of the plurality of secondary devices; obtain a device filtering condition corresponding to the event type, where the device filtering condition is used to indicate device information of a secondary device matching the event type; determine, based on the device information of each of the plurality of secondary devices, a first secondary device that meets the device filtering condition; and send the event type and the event information to the first secondary device when determining that a data type of the event information is a data type supported by the first secondary device.

In an embodiment, the processor 1801 is specifically configured to: encrypt the event type and the event information to obtain encrypted data; and send the encrypted data to the first secondary device.

In an embodiment, the processor 1801 is further configured to: when determining that the data type of the event information is a data type not supported by the first secondary device, convert the event information into a data type supported by the first secondary device, to obtain target data; and send the event type and the target data to the first secondary device.

In an embodiment, when the data type supported by the first secondary device is an audio type and the event type is a notification-type event, the target data is audio data; when the data type supported by the first secondary device is an audio type and the event type is a music playing event, the target data is audio data; or when the data type supported by the first secondary device is an instruction type and the event type is a notification-type event, the target data is a control instruction.

In an embodiment, the processor 1801 is specifically configured to: encrypt the event type and the target data to obtain encrypted data; and send the encrypted data to the first secondary device.

In an embodiment, the device information includes an operating status of the secondary device, an output capability of the secondary device, and a distance between the secondary device and a user.

In an embodiment, when the event type is a notification-type event, the device filtering condition includes: the secondary device is in a power-on state, the distance between the secondary device and the user is less than a threshold, and the secondary device has an output capability of displaying an image, outputting a sound, or vibration; when the event type is a video playing event, the device filtering condition includes: the secondary device is in a power-on state, the distance between the secondary device and the user is less than a threshold, and the secondary device has an output capability of displaying an image and outputting a sound; or when the event type is a music playing event, the device filtering condition includes: the secondary device is in a power-on state, the distance between the secondary device and the user is less than a threshold, and the secondary device has an output capability of outputting a sound.

In an embodiment, the to-be-processed event is a notification-type event, a speech instruction, or a screen touch instruction.

In an embodiment, the processor 1801 is specifically configured to: send a device information obtaining instruction to each of the plurality of secondary devices; and receive the device information sent by each of the plurality of secondary devices.

In the embodiment shown in FIG. 18, the processor 1801 may include one or more processing cores. For example, the processor 1801 may be a single-core processor. For another example, the processor 1801 may be an octa-core processor. For still another example, the processor 1801 may be a 12-core processor. Certainly, as technologies develop, a quantity of cores of the processor 1801 may continuously increase, and the quantity of cores of the processor 1801 is not limited to the foregoing quantities.

In the embodiment shown in FIG. 18, the processor 1801 of the intermediate device receives the to-be-processed event sent by the primary device, obtains the device information of each of the plurality of secondary devices, obtains the device filtering condition corresponding to the event type, then selects, from the plurality of secondary devices based on the obtained device information and the obtained device filtering condition, the first secondary device suitable for presenting the event type of the to-be-processed event, and sends the event information to the first secondary device, so that the first secondary device assists the primary device in presenting the event information. The processor 1801 of the intermediate device can assist the primary device to actively cooperate with another secondary device to jointly complete the to-be-processed event, so that an actual requirement of the user is met better.

Figure 19:
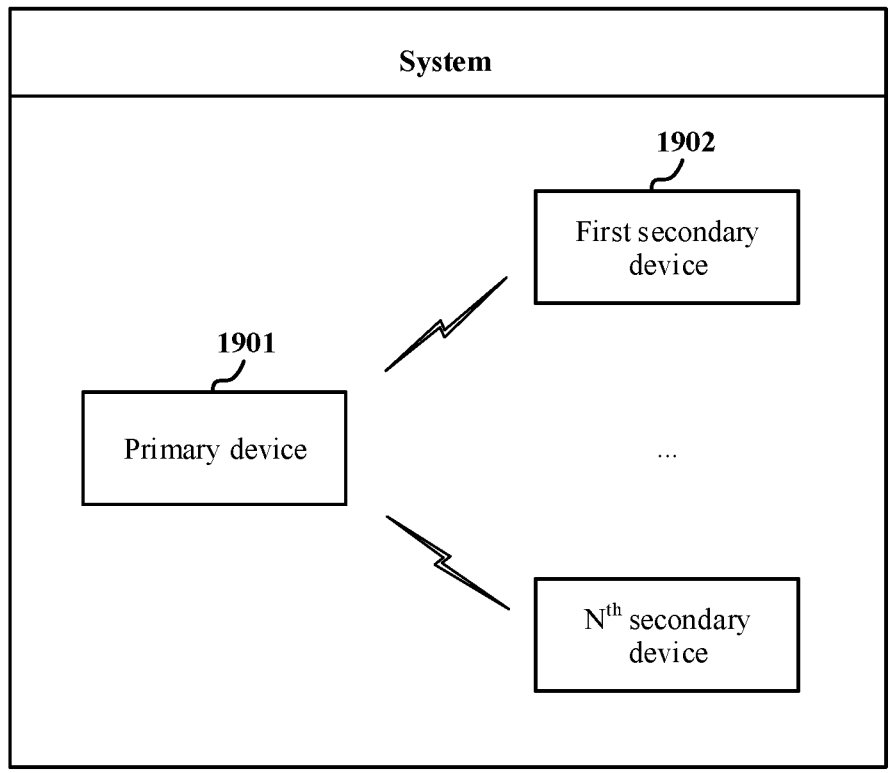
FIG. 19 is a schematic diagram of a system according to an embodiment of this application.

FIG. 19 is a schematic diagram of a system according to an embodiment of this application. The system shown in FIG. 19 includes a primary device 1901 and N secondary devices. The N secondary devices may be two or more secondary devices. The primary device 1901 pre-establishes communication connections to the N secondary devices. The primary device 1901 may actively cooperate with another secondary device to jointly complete a to-be-processed event. The device cooperation method shown in FIG. 15 may be applied to the primary device 1901 shown in FIG. 19. For a function implementation of the primary device 1901 shown in FIG. 19, refer to the embodiment shown in FIG. 15.

In the embodiment shown in FIG. 19, the primary device 1901 is configured to: receive a to-be-processed event; recognize an event type and event information of the to-be-processed event; obtain device information of each of the N secondary devices; obtain a device filtering condition corresponding to the event type, where the device filtering condition is used to indicate device information of a secondary device matching the event type; determine, based on the device information of each of the N secondary devices, a first secondary device 1902 that meets the device filtering condition; and send the event type and the event information to the first secondary device 1902 when determining that a data type of the event information is a data type supported by the first secondary device 1902. The first secondary device 1902 is configured to: receive the event type and the event information that are sent by the primary device, and present the event information based on the event type.

In an embodiment, the primary device 1901 is specifically configured to: encrypt the event type and the event information to obtain encrypted data; and send the encrypted data to the first secondary device 1902.

In an embodiment, the primary device 1901 is further configured to: when determining that the data type of the event information is a data type not supported by the first secondary device 1902, convert the event information into a data type supported by the first secondary device 1902, to obtain target data; and send the event type and the target data to the first secondary device 1902.

In an embodiment, when the data type supported by the first secondary device 1902 is an audio type and the event type is a notification-type event, the target data is audio data; when the data type supported by the first secondary device 1902 is an audio type and the event type is a music playing event, the target data is audio data; or when the data type supported by the first secondary device 1902 is an instruction type and the event type is a notification-type event, the target data is a control instruction.

In an embodiment, the primary device 1901 is specifically configured to: encrypt the event type and the target data to obtain encrypted data; and send the encrypted data to the first secondary device 1902.

In an embodiment, the device information includes an operating status of the secondary device, an output capability of the secondary device, and a distance between the secondary device and a user.

In an embodiment, when the event type is a notification-type event, the device filtering condition includes: the secondary device is in a power-on state, the distance between the secondary device and the user is less than a threshold, and the secondary device has an output capability of displaying an image, outputting a sound, or vibration; when the event type is a video playing event, the device filtering condition includes: the secondary device is in a power-on state, the distance between the secondary device and the user is less than a threshold, and the secondary device has an output capability of displaying an image and outputting a sound; or when the event type is a music playing event, the device filtering condition includes: the secondary device is in a power-on state, the distance between the secondary device and the user is less than a threshold, and the secondary device has an output capability of outputting a sound.

In an embodiment, the to-be-processed event is a notification-type event, a speech instruction, or a screen touch instruction.

In an embodiment, the primary device 1901 is specifically configured to: send a device information obtaining instruction to each of the N secondary devices; and receive the device information sent by each of the N secondary devices.

In the embodiment shown in FIG. 19, the primary device 1901 obtains the device information of each of the N secondary devices, obtains the device filtering condition corresponding to the event type, then selects, from the N secondary devices based on the obtained device information and the obtained device filtering condition, the first secondary device 1902 suitable for presenting the event type of the to-be-processed event, and sends the event information to the first secondary device 1902, so that the first secondary device 1902 assists the primary device 1901 in presenting the event information. The primary device 1901 can actively cooperate with another secondary device to jointly complete the to-be-processed event, so that an actual requirement of the user is met better.

Figure 20:
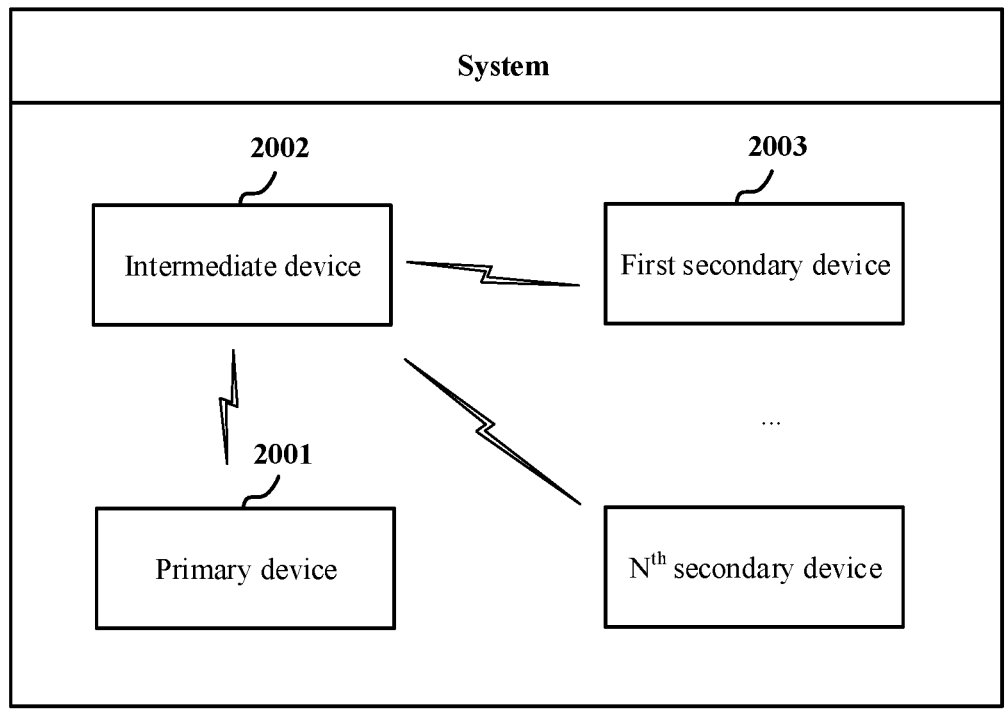
FIG. 20 is a schematic diagram of another system according to an embodiment of this application.

FIG. 20 is a schematic diagram of another system according to an embodiment of this application. The system shown in FIG. 20 includes a primary device 2001, an intermediate device 2002, and N secondary devices. The N secondary devices may be two or more secondary devices. The intermediate device 2002 pre-establishes communication connections to the primary device 2001 and the N secondary devices. The intermediate device 2002 may assist the primary device 2001 to actively cooperate with another secondary device to jointly complete a to-be-processed event. The device cooperation method shown in FIG. 16 may be applied to the intermediate device 2002 shown in FIG. 20. For a function implementation of the intermediate device 2002 shown in FIG. 20, refer to the embodiment shown in FIG. 16.

In the embodiment shown in FIG. 20, the primary device 2001 is configured to: receive a to-be-processed event, and send the to-be-processed event to the intermediate device. The intermediate device 2002 is configured to: receive the to-be-processed event sent by the primary device 2001; recognize an event type and event information of the to-be-processed event; obtain device information of each of the N secondary devices; obtain a device filtering condition corresponding to the event type, where the device filtering condition is used to indicate device information of a secondary device matching the event type; determine, based on the device information of each of the N secondary devices, a first secondary device 2003 that meets the device filtering condition; and send the event type and the event information to the first secondary device 2003 when determining that a data type of the event information is a data type supported by the first secondary device 2003. The first secondary device 2003 is configured to: receive the event type and the event information that are sent by the intermediate device 2002, and present the event information based on the event type.

In an embodiment, the intermediate device 2002 is specifically configured to: encrypt the event type and the event information to obtain encrypted data; and send the encrypted data to the first secondary device 2003.

In an embodiment, the intermediate device 2002 is further configured to: when determining that the data type of the event information is a data type not supported by the first secondary device 2003, convert the event information into a data type supported by the first secondary device 2003, to obtain target data; and send the event type and the target data to the first secondary device 2003.

In an embodiment, when the data type supported by the first secondary device 2003 is an audio type and the event type is a notification-type event, the target data is audio data; when the data type supported by the first secondary device 2003 is an audio type and the event type is a music playing event, the target data is audio data; or when the data type supported by the first secondary device 2003 is an instruction type and the event type is a notification-type event, the target data is a control instruction.

In an embodiment, the intermediate device 2002 is specifically configured to: encrypt the event type and the target data to obtain encrypted data; and send the encrypted data to the first secondary device 2003.

In an embodiment, the device information includes an operating status of the secondary device, an output capability of the secondary device, and a distance between the secondary device and a user.

In an embodiment, when the event type is a notification-type event, the device filtering condition includes: the secondary device is in a power-on state, the distance between the secondary device and the user is less than a threshold, and the secondary device has an output capability of displaying an image, outputting a sound, or vibration; when the event type is a video playing event, the device filtering condition includes: the secondary device is in a power-on state, the distance between the secondary device and the user is less than a threshold, and the secondary device has an output capability of displaying an image and outputting a sound; or when the event type is a music playing event, the device filtering condition includes: the secondary device is in a power-on state, the distance between the secondary device and the user is less than a threshold, and the secondary device has an output capability of outputting a sound.

In an embodiment, the to-be-processed event is a notification-type event, a speech instruction, or a screen touch instruction.

In an embodiment, the intermediate device 2002 is specifically configured to: send a device information obtaining instruction to each of the N secondary devices; and receive the device information sent by each of the N secondary devices.

In the embodiment shown in FIG. 20, the intermediate device 2002 receives the to-be-processed event sent by the primary device 2001, obtains the device information of each of the N secondary devices, obtains the device filtering condition corresponding to the event type, then selects, from the N secondary devices based on the obtained device information and the obtained device filtering condition, the first secondary device 2003 suitable for presenting the event type of the to-be-processed event, and sends the event information to the first secondary device 2003, so that the first secondary device 2003 assists the primary device 2001 in presenting the event information. The intermediate device 2002 can assist the primary device 2001 to actively cooperate with another secondary device to jointly complete the to-be-processed event, so that an actual requirement of the user is met better.

It should be noted that, when a function implemented by software is related in the foregoing embodiments, related software or a module in the software may be stored in a computer-readable medium or transmitted as one or more instructions or code in the computer-readable medium. The computer-readable medium includes a computer storage medium and a communications medium. The communications medium includes any medium that facilitates transmission of a computer program from one place to another. The storage medium may be any available medium that can be accessed by a computer. The following provides an example but does not impose a limitation: The computer-readable medium may include a RAM, a ROM, an EEPROM, a CD-ROM or another compact disc storage, a magnetic disk storage medium or another magnetic storage device, or any other medium that can carry or store expected program code in a form of instructions or a data structure and can be accessed by a computer. In addition, any connection may be appropriately defined as a computer-readable medium. For example, if software is transmitted from a website, a server, or another remote source through a coaxial cable, an optical fiber/cable, a twisted pair, a digital subscriber line (DSL), or wireless technologies such as infrared, radio, and microwave, the coaxial cable, optical fiber/cable, twisted pair, DSL, or the wireless technologies such as infrared, radio, and microwave are included in a definition of a medium to which they belong. A disk (Disk) and a disc (disc) used in this application include a compact disc (CD), a laser disc, an optical disc, a digital versatile disc (DVD), a floppy disk, and a Blu-ray disc. The disk usually copies data in a magnetic manner, whereas the disc copies data optically through a laser. The foregoing combination shall also be included in the protection scope of the computer-readable medium.

In addition, the foregoing embodiments are merely intended to describe the technical solutions in this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof.

What is claimed is:

1. A device cooperation method, wherein the method is applied in a primary device, the primary device pre-establishes communication connections to a plurality of secondary devices, and the method comprises:
   receiving, by the primary device, a to-be-processed event;
   recognizing, by the primary device, an event type and event information of the to-be-processed event, the event information indicating a data type of the event information;
   obtaining, by the primary device, device information of each of the plurality of secondary devices;
   obtaining, by the primary device, a device filtering condition corresponding to the event type, wherein the device filtering condition is used to indicate device information of a secondary device matching the event type;
   determining, by the primary device based on the device information of each of the plurality of secondary devices, a first secondary device that satisfies the device filtering condition;

determining, by the primary device based on the device information of the first secondary device and on the data type of the event information indicated in the event information, whether the data type of the event information is a data type supported by the first secondary device; and sending, by the primary device, the event type and the event information to the first secondary device based on the primary device determining that the data type of the event information is a data type supported by the first secondary device, wherein after the determining, by the primary device based on the device information of each of the plurality of secondary devices, the first secondary device that satisfies the device filtering condition, the method further comprises:

based on the primary device determining that the data type of the event information is a data type not supported by the first secondary device, converting, by the primary device, the event information into a data type supported by the first secondary device, to obtain target data; and sending, by the primary device, the event type and the target data to the first secondary device.

2. The device cooperation method according to claim 1, wherein the sending, by the primary device, the event type and the event information to the first secondary device comprises:

encrypting, by the primary device, the event type and the event information to obtain encrypted data; and sending, by the primary device, the encrypted data to the first secondary device.

3. The device cooperation method according to claim 1, wherein based on the data type supported by the first secondary device being an audio type and the event type being a notification-type event, the target data is audio data;

based on the data type supported by the first secondary device being an audio type and the event type being a music playing event, the target data is audio data; or based on the data type supported by the first secondary device being an instruction type and the event type being a notification-type event, the target data is a control instruction.

4. The device cooperation method according to claim 1, wherein the sending, by the primary device, the event type and the target data to the first secondary device comprises:

encrypting, by the primary device, the event type and the target data to obtain encrypted data; and sending, by the primary device, the encrypted data to the first secondary device.

5. The device cooperation method according to claim 1, wherein the device information comprises an operating status of the secondary device, an output capability of the secondary device, and a distance between the secondary device and a user.

6. The device cooperation method according to claim 5, wherein based on the event type being a notification-type event, the device filtering condition comprises: the secondary device is in a power-on state, the distance between the secondary device and the user is less than a threshold distance, and the secondary device has an output capability of displaying an image, outputting a sound, or vibration;

based on the event type being a video playing event, the device filtering condition comprises: the secondary device is in a power-on state, the distance between the secondary device and the user is less than a threshold distance, and the secondary device has an output capability of displaying an image and outputting a sound; or based on the event type being a music playing event, the device filtering condition comprises: the secondary device is in a power-on state, the distance between the secondary device and the user is less than a threshold distance, and the secondary device has an output capability of outputting a sound.

7. The device cooperation method according to claim 1, wherein the to-be-processed event is a notification-type event, a speech instruction, or a screen touch instruction.

8. The device cooperation method according to claim 1, wherein the obtaining, by the primary device, the device information of each of the plurality of secondary devices comprises:

sending, by the primary device, a device information obtaining instruction to each of the plurality of secondary devices; and receiving, by the primary device, the device information sent by each of the plurality of secondary devices.

9. A device cooperation method, wherein the method is applied in an intermediate device, the intermediate device pre-establishes communication connections to one primary device and a plurality of secondary devices, and the method comprises:

receiving, by the intermediate device, a to-be-processed event sent by the primary device;

recognizing, by the intermediate device, an event type and event information of the to-be-processed event, the event information indicating a data type of the event information;

obtaining, by the intermediate device, device information of each of the plurality of secondary devices;

obtaining, by the intermediate device, a device filtering condition corresponding to the event type, wherein the device filtering condition is used to indicate device information of a secondary device matching the event type;

determining, by the intermediate device based on the device information of each of the plurality of secondary devices, a first secondary device that satisfies the device filtering condition;

determining, by the intermediate device based on the device information of the first secondary device and on the data type of the event information indicated in the event information, whether the data type of the event information is a data type supported by the first secondary device; and sending, by the intermediate device, the event type and the event information to the first secondary device based on the intermediate device determining that the data type of the event information is a data type supported by the first secondary device, wherein after the determining, by the intermediate device based on the device information of each of the plurality of secondary devices, the first secondary device that satisfies the device filtering condition, the method further comprises:

based on the intermediate device determining that the data type of the event information is a data type not supported by the first secondary device, converting, by the intermediate device, the event information into a data type supported by the first secondary device, to obtain target data; and sending, by the intermediate device, the event type and the target data to the first secondary device.

10. A primary device, wherein the primary device pre-establishes communication connections to a plurality of secondary devices, the primary device comprises a processor and a memory, the memory is configured to store instructions, and the processor is configured to execute the instructions stored in the memory; and the processor is configured to:

receive a to-be-processed event;

recognize an event type and event information of the to-be-processed event, the event information indicating a data type of the event information;

obtain device information of each of the plurality of secondary devices;

obtain a device filtering condition corresponding to the event type, wherein the device filtering condition is used to indicate device information of a secondary device matching the event type;

determine, based on the device information of each of the plurality of secondary devices, a first secondary device that satisfies the device filtering condition;

determine based on the device information of the first secondary device and on the data type of the event information indicated in the event information, whether the data type of the event information is a data type supported by the first secondary device; and send the event type and the event information to the first secondary device based on determining that the data type of the event information is a data type supported by the first secondary device, and based on determining that the data type of the event information is a data type not supported by the first secondary device:

convert the event information into a data type supported by the first secondary device, to obtain target data; and send the event type and the target data to the first secondary device.

11. The primary device according to claim 10, wherein the processor is configured to:

encrypt the event type and the event information to obtain encrypted data; and send the encrypted data to the first secondary device.

12. The primary device according to claim 10, wherein based on the data type supported by the first secondary device being an audio type and the event type being a notification-type event, the target data is audio data;

based on the data type supported by the first secondary device being an audio type and the event type being a music playing event, the target data is audio data; or based on the data type supported by the first secondary device being an instruction type and the event type being a notification-type event, the target data is a control instruction.

13. The primary device according to claim 10, wherein the processor is configured to:

encrypt the event type and the target data to obtain encrypted data; and send the encrypted data to the first secondary device.

14. The primary device according to claim 10, wherein the device information comprises an operating status of the secondary device, an output capability of the secondary device, and a distance between the secondary device and a user.

15. The primary device according to claim 14, wherein based on the event type being a notification-type event, the device filtering condition comprises: the secondary device is in a power-on state, the distance between the secondary device and the user is less than a threshold distance, and the secondary device has an output capability of displaying an image, outputting a sound, or vibration;

based on the event type being a video playing event, the device filtering condition comprises: the secondary device is in a power-on state, the distance between the secondary device and the user is less than a threshold distance, and the secondary device has an output capability of displaying an image and outputting a sound; or based on the event type being a music playing event, the device filtering condition comprises: the secondary device is in a power-on state, the distance between the secondary device and the user is less than a threshold distance, and the secondary device has an output capability of outputting a sound.

16. The primary device according to claim 10, wherein the to-be-processed event is a notification-type event, a speech instruction, or a screen touch instruction.

17. The primary device according to claim 10, wherein the processor is configured to:

send a device information obtaining instruction to each of the plurality of secondary devices; and receive the device information sent by each of the plurality of secondary devices.

* * * * *